(12) United States Patent
Ishihara et al.

(10) Patent No.: US 10,428,213 B2
(45) Date of Patent: Oct. 1, 2019

(54) (METH)ACRYLIC RESIN COMPOSITION AND RESIN MOLDED ARTICLE

(71) Applicant: Mitsubishi Chemical Corporation, Chiyoda-ku (JP)

(72) Inventors: Yutaka Ishihara, Tokyo (JP); Masahiro Nakano, Tokyo (JP); Masanori Suzuki, Tokyo (JP); Hiroshi Okafuji, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 4 days.

(21) Appl. No.: 15/520,304

(22) PCT Filed: Oct. 21, 2015

(86) PCT No.: PCT/JP2015/079670
§ 371 (c)(1),
(2) Date: Apr. 20, 2017

(87) PCT Pub. No.: WO2016/063898
PCT Pub. Date: Apr. 28, 2016

(65) Prior Publication Data
US 2018/0223091 A1 Aug. 9, 2018

(30) Foreign Application Priority Data

| Oct. 21, 2014 | (JP) | 2014-214176 |
| Jan. 29, 2015 | (JP) | 2015-015740 |
| Feb. 25, 2015 | (JP) | 2015-035185 |
| Aug. 21, 2015 | (JP) | 2015-163651 |
| Aug. 21, 2015 | (JP) | 2015-163653 |
| Aug. 21, 2015 | (JP) | 2015-163654 |

(51) Int. Cl.
| *C08L 33/10* | (2006.01) |
| *C08K 5/521* | (2006.01) |
| *C08F 220/18* | (2006.01) |
| *C08L 33/12* | (2006.01) |
| *C08F 220/14* | (2006.01) |
| *C08F 265/06* | (2006.01) |
| *B32B 27/08* | (2006.01) |
| *C08F 222/10* | (2006.01) |

(52) U.S. Cl.
CPC .............. *C08L 33/10* (2013.01); *B32B 27/08* (2013.01); *C08F 220/14* (2013.01); *C08F 220/18* (2013.01); *C08F 265/06* (2013.01); *C08K 5/521* (2013.01); *C08L 33/12* (2013.01); *C08F 2220/1816* (2013.01); *C08F 2220/1825* (2013.01); *C08F 2220/1833* (2013.01); *C08F 2222/1013* (2013.01); *C08F 2800/20* (2013.01); *C08L 2201/02* (2013.01); *C08L 2201/10* (2013.01)

(58) Field of Classification Search
CPC .. C08L 33/10; C08L 2201/02; C08L 2201/10; C08K 5/521; C08F 220/18; C08F 2220/1833; C08F 2222/1013; C08F 2800/20
See application file for complete search history.

(56) References Cited

U.S. PATENT DOCUMENTS

| 3,634,554 A | 1/1972 | Forsyth |
| 5,286,834 A | 2/1994 | Sakashita et al. |
| 2012/0101190 A1 | 4/2012 | Okoshi et al. |

FOREIGN PATENT DOCUMENTS

| EP | 2 444 457 A1 | 4/2012 | |
| GB | 1120762 | 7/1968 | |
| JP | 44-29382 | 11/1969 | |
| JP | 61-141759 A | 6/1986 | |
| JP | 5-117382 A | 5/1993 | |
| JP | 8-113655 A | 5/1996 | |
| JP | 9-118799 A | 5/1997 | |
| JP | 2001-55406 A | 2/2001 | |
| JP | 2003-201385 A | 7/2003 | |
| JP | 2004-18765 A | 1/2004 | |
| JP | 2006-199732 A | 8/2006 | |
| JP | 2009-132802 A | 6/2009 | |
| JP | 2010-116467 A | 5/2010 | |
| JP | 2011-046835 | * 3/2011 | ............ C08L 33/00 |
| JP | 2011-46835 A | 3/2011 | |
| JP | 2012-144713 A | 8/2012 | |

(Continued)

OTHER PUBLICATIONS

International Search Report dated Jan. 19, 2016 in PCT/JP2015/079670 filed Oct. 21, 2015.

(Continued)

*Primary Examiner* — Robert D Harlan

(74) *Attorney, Agent, or Firm* — Oblon, McClelland, Maier & Neustadt, L.L.P.

(57) ABSTRACT

A (meth)acrylic resin composition containing a (meth)acrylic polymer (P) and a phosphorus atom-containing compound (C), where the (meth)acrylic polymer (P) contains: (1) a repeating unit derived from methyl methacrylate at 19.95 to 84.95% by mass; (2) a repeating unit derived from a (meth)acrylic acid ester (M) having an aromatic hydrocarbon group or an alicyclic hydrocarbon group having from 3 to 20 carbon atoms in a side chain at 15.0 to 80.0% by mass; and (3) a repeating unit derived from a monomer (B) having two or more vinyl groups at 0.05 to 0.40% by mass, and an amount of the phosphorus atom-containing compound (C) with respect to 100 parts by mass of the (meth)acrylic polymer (P) being 5.0 to 35 parts by mass or less.

11 Claims, No Drawings

(56) References Cited

FOREIGN PATENT DOCUMENTS

JP          2013-82814 A      5/2013
WO       2012/161100 A1    11/2012

OTHER PUBLICATIONS

Office Action dated May 29, 2018 in Australian Patent Application No. 2015336539.
Extended European Search Report dated Apr. 10, 2018 in Patent Application No. 15853037.8, 8 pages.
Office Action in corresponding Japanese Application No. 2015-555312, dated Jun. 25, 2019. (w/English Translation).

* cited by examiner

(METH)ACRYLIC RESIN COMPOSITION AND RESIN MOLDED ARTICLE

TECHNICAL FIELD

The present invention relates to a (meth)acrylic resin composition and a resin molded article.

This application is based upon and claims the benefit of priority of the prior Japanese Patent Application No. 2014-214176 filed in Japan on Oct. 21, 2014, the prior Japanese Patent Application No. 2015-015740 filed in Japan on Jan. 29, 2015, the prior Japanese Patent Application No. 2015-035185 filed in Japan on Feb. 25, 2015, the prior Japanese Patent Application No. 2015-163651 filed in Japan on Aug. 21, 2015, the prior Japanese Patent Application No. 2015-163653 filed in Japan on Aug. 21, 2015, and the prior Japanese Patent Application No. 2015-163654 filed in Japan on Aug. 21, 2015, the entire contents of which are incorporated herein by reference.

BACKGROUND ART (Meth)acrylic resins containing methyl methacrylate as a main component exhibit excellent transparency, heat resistance, and weather resistance and have well-balanced performance in resin physical properties such as mechanical strength, thermal properties, and molding processability. Hence, they are used in a great number of applications such as lighting materials, optical materials, signboards, displays, decorative members, and building materials, and these applications are required to exhibit flame retardancy and heat resistance.

Hence, investigations have been carried out to impart flame retardancy to (meth)acrylic resin products without impairing transparency, heat resistance, or weather resistance which is a feature of (meth) acrylic resins.

Patent Literature 1 proposes a flame retardant methacrylic resin plate containing a (meth)acrylic polymer containing methyl methacrylate and isobornyl (meth)acrylate and a flame resistant polymeric phosphorus compound.

Patent Literature 2 proposes a flame retardant methacrylic resin plate composed of a methacrylic resin containing a heat resistance improving monomer and a halogenated phosphoric acid ester and discloses dicyclopentanyl (meth)acrylate as the heat resistance improving monomer.

CITATION LIST

Patent Literature

Patent Literature 1: JP 44-29382 B
Patent Literature 2: JP 2011-46835 A

SUMMARY OF THE INVENTION

Problem to be Solved by the Invention

However, the methacrylic resin plate described in Patent Literature 1 does not exhibit sufficient flame retardancy although heat resistance is obtained. In particular, it is rejected by the flame retardant standard specified in JIS K 6911 method A or UL 94 in some cases, and flame retardancy is not sufficient for applications which require these standards.

In addition, the methacrylic resin plate described in Patent Literature 2 exhibits improved flame retardancy but does not exhibit sufficient heat resistance since the content of the heat resistance improving monomer in the resin plate is small. Hence, it has been difficult to obtain a methacrylic resin plate which exhibits both high flame retardancy and heat resistance having a heat deflection temperature (HDT) of 90° C. or higher.

In such circumstances, a resin molded article which exhibits excellent flame retardancy without impairing the transparency, heat resistance, and weather resistance which are the features of a (meth)acrylic resin and a (meth)acrylic resin composition for producing the resin molded article have been required.

The first object of the invention is to provide a resin molded article which exhibits flame retardancy to be non-inflammable in the test by JIS K 6911 method A and heat resistance having a heat deflection temperature (HDT) of 60° C. or higher and a (meth)acrylic resin composition for producing the resin molded article.

The second object of the invention is to provide a resin molded article which exhibits flame retardancy to be non-inflammable in the test by JIS K 6911 method A and high heat resistance having a heat deflection temperature (HDT) of 90° C. or higher and a (meth)acrylic resin composition for producing the resin molded article.

In addition, the third object of the invention is to provide a resin molded article which exhibits flame retardancy of V-0 class in the vertical burning test specified in UL 94, heat resistance having a heat deflection temperature (HDT) of 60° C. or higher, and excellent transparency and a (meth) acrylic resin composition for producing the resin molded article.

Furthermore, the fourth object of the invention is to provide a resin molded article which exhibits flame retardancy of V-0 class in the vertical burning test specified in UL 94, high heat resistance having a heat deflection temperature (HDT) of 90° C. or higher, and excellent transparency and a (meth)acrylic resin composition for producing the resin molded article.

Means for Solving Problem

The above objects are achieved by the following inventions [1] to [15].

[1] The invention relates to a (meth)acrylic resin composition containing a (meth)acrylic polymer (P) and a phosphorus atom-containing compound (C), in which the (meth) acrylic polymer (P) contains (1) a repeating unit derived from methyl methacrylate at 19.95% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less, and an amount of the phosphorus atom-containing compound (C) with respect to 100 parts by mass of the (meth)acrylic polymer (P) is 5.0 parts by mass or more and 35 parts by mass or less.

[2] The (meth)acrylic polymer (P) is preferably a polymer which contains a repeating unit derived from a methacrylic acid ester (M1) having an aromatic hydrocarbon group or an alicyclic hydrocarbon group having from 3 to 20 carbon atoms in a side chain at 10% by mass or more and 79.5% by mass or less and a repeating unit derived from an acrylic acid ester (M2) having an aromatic hydrocarbon group or an alicyclic hydrocarbon group having from 3 to 20 carbon atoms in a side chain at 0.50% by mass or more and 20% by mass or less and has a sum of the repeating unit derived from a methacrylic acid ester (M1) and the repeating unit derived from an acrylic acid ester (M2) of 15.0% by mass or more and 80.0% by mass or less.

[3] The methacrylic acid ester (M1) may contain a methacrylic acid ester homopolymer having a glass transition temperature of 45° C. or higher and 200° C. or lower.

[4] The acrylic acid ester (M2) may contain an acrylic acid ester homopolymer having a glass transition temperature of 3° C. or higher and 145° C. or lower.

[5] The acrylic acid ester (M2) may contain an acrylic acid ester homopolymer (E) having a glass transition temperature of 15° C. or higher and 115° C. or lower.

[6] The (meth)acrylic polymer (P) may contain a repeating unit derived from the acrylic acid ester homopolymer (E) at 1.0% by mass or more and 4.99% by mass or less.

[7] At least one kind selected from isobornyl methacrylate or cyclohexyl methacrylate may be used as the methacrylic acid ester (M1). In addition, at least one kind (hereinafter, referred to as the "monomer (D)") selected from isobornyl acrylate or cyclohexyl acrylate may be used as the acrylic acid ester (M2).

[8] The (meth)acrylic resin composition may contain a phosphorus atom-containing compound (C) at Y parts by mass with respect to 100 parts by mass of the (meth)acrylic polymer (P), in which
Y is represented by the following formulas:

$$5.00 \leq Y \leq 13.6 \text{ in a case of } 15.0 \leq X \leq 41.4, \text{ and}$$

$$5.00 \leq Y \leq 0.0700X + 10.7 \text{ in a case of } 41.4 < X \leq 80.0$$

(where, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

[9] The (meth)acrylic resin composition may contain a phosphorus atom-containing compound (C) at Y parts by mass with respect to 100 parts by mass of the (meth)acrylic polymer (P), in which
Y is represented by the following formulas:

$$13.6 < Y \leq 35.0 \text{ in a case of } 15.0 \leq X \leq 41.4, \text{ and}$$

$$-0.07X + 16.5 < Y \leq 35.0 \text{ in a case of } 41.4 < X \leq 80.0,$$

(where, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

[10] A monomer having from 10 to 14 carbon atoms may be used as the monomer (B), and further the monomer (B) may contain at least one kind selected from ethylene glycol di(meth)acrylate or neopentyl glycol di(meth)acrylate.

[11] At least one kind selected from a phosphoric acid ester or a phosphonic acid ester may be used as the phosphorus atom-containing compound (C).

[12] The invention relates to a resin molded article including a (meth)acrylic resin composition which exhibits noninflammability in a test by JIS K 6911 method A and has a heat deflection temperature (HDT) of 60° C. or higher.

[13] The invention relates to a resin molded article including a (meth)acrylic resin composition which exhibits noninflammability in a test by JIS K 6911 method A and has a heat deflection temperature (HDT) of 90° C. or higher.

[14] The invention relates to a resin molded article which exhibits flame retardancy of V-0 in a vertical burning test specified in UL 94 and has a heat deflection temperature (HDT) of 60° C. or higher and a total light transmittance of 89% or more.

[15] The invention relates to a resin molded article which exhibits flame retardancy of V-0 in a vertical burning test specified in UL 94 and has a heat deflection temperature (HDT) of 90° C. or higher and a total light transmittance of 89% or more.

The preferred embodiments of the present invention are enumerated below.

1. A (meth)acrylic resin composition comprising a (meth)acrylic polymer (P) and a phosphorus atom-containing compound (C), wherein
the (meth)acrylic polymer (P) contains
(1) a repeating unit derived from methyl methacrylate at 19.95% by mass or more and 84.95% by mass or less,
(2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and
(3) a repeating unit derived from a monomer (B) having two or more vinyl groups at 0.05% by mass or more and 0.40% by mass or less, and
an amount of the phosphorus atom-containing compound (C) with respect to 100 parts by mass of the (meth)acrylic polymer (P) is 5.0 parts by mass or more and 35 parts by mass or less.

2. The (meth)acrylic resin composition according to item 1 above, wherein
the (meth)acrylic polymer (P) is a polymer which contains
(1) a repeating unit derived from a methacrylic acid ester (M1) having an aromatic hydrocarbon group or an alicyclic hydrocarbon group having from 3 to 20 carbon atoms in a side chain at 10% by mass or more and 79.5% by mass or less and
(2) a repeating unit derived from an acrylic acid ester (M2) having an aromatic hydrocarbon group or an alicyclic hydrocarbon group having from 3 to 20 carbon atoms in a side chain at 0.50% by mass or more and 20% by mass or less, and has
a sum of the repeating unit derived from a methacrylic acid ester (M1) and the repeating unit derived from an acrylic acid ester (M2) of 15.0% by mass or more and 80.0% by mass or less.

3. The (meth)acrylic resin composition according to item 1 or 2 above, wherein an amount of the repeating unit derived from methyl methacrylate in the (meth)acrylic polymer (P) is 19.95% by mass or more and 79.1% by mass or less and an amount of the repeating unit derived from a (meth)acrylic acid ester (M) is 20.5% by mass or more and 80.0% by mass or less.

4. The (meth)acrylic resin composition according to item 2 or 3 above, wherein the (meth)acrylic polymer (P) is a polymer which contains
(1) the repeating unit derived from a methacrylic acid ester (M1) at 10% by mass or more and 79.5% by mass or less and
(2) the repeating unit derived from acrylic acid ester (M2) at 0.50% by mass or more and 20.0% by mass or less as the repeating unit derived from a (meth)acrylic acid ester (M) and has a sum of the repeating unit derived from a methacrylic acid ester (M1) and the repeating unit derived from an acrylic acid ester (M2) of 20.5% by mass or more and 80.0% by mass or less.

5. The (meth)acrylic resin composition according to any one of items 2 to 4 above, wherein the methacrylic acid ester (M1) contains a methacrylic acid ester homopolymer having a glass transition temperature of 45° C. or higher and 200° C. or lower.

6. The (meth)acrylic resin composition according to any one of items 2 to 5 above, wherein the acrylic acid ester (M2) contains an acrylic acid ester homopolymer having a glass transition temperature of 3° C. or higher and 145° C. or lower.

7. The (meth)acrylic resin composition according to item 6 above, wherein the acrylic acid ester (M2) contains an acrylic acid ester homopolymer (E) having a glass transition temperature of 15° C. or higher and 115° C. or lower.

8. The (meth)acrylic resin composition according to item 7 above, wherein the (meth)acrylic polymer (P) contains a repeating unit derived from the acrylic acid ester homopolymer (E) at 1.0% by mass or more and 4.99% by mass or less.

9. The (meth)acrylic resin composition according to any one of items 2 to 8 above, wherein the methacrylic acid ester (M1) is at least one kind selected from isobornyl methacrylate or cyclohexyl methacrylate.

10. The (meth)acrylic resin composition according to any one of items 2 to 9 above, wherein the acrylic acid ester (M2) is at least one kind selected from isobornyl acrylate or cyclohexyl acrylate.

11. The (meth)acrylic resin composition according to any one of items 1 to 10 above, comprising a phosphorus atom-containing compound (C) at Y parts by mass with respect to 100 parts by mass of the (meth)acrylic polymer (P), wherein Y is represented by the following formulas:

$$5.00 \leq Y \leq 13.6 \text{ in a case of } 15.0 \leq X \leq 41.4, \text{ and}$$

$$5.00 \leq Y \leq 0.0700X+10.7 \text{ in a case of } 41.4 < X \leq 80.0$$

(wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

12. A resin molded article comprising a (meth)acrylic resin composition which exhibits noninflammability in a test by JIS K 6911 method A and has a heat deflection temperature (HDT) of 90° C. or higher.

13. The (meth)acrylic resin composition according to any one of items 1 to 10 above, comprising a phosphorus atom-containing compound (C) at Y parts by mass with respect to 100 parts by mass of the (meth)acrylic polymer (P), wherein Y is represented by the following formulas:

$$13.6 < Y \leq 35.0 \text{ in a case of } 15.0 \leq X \leq 41.4, \text{ and}$$

$$-0.07X+16.5 < Y \leq 35.0 \text{ in a case of } 41.4 < X \leq 80.0,$$

(wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

14. A resin molded article which exhibits flame retardancy of V-0 in a vertical burning test specified in UL 94 and has a heat deflection temperature (HDT) of 60° C. or higher and a total light transmittance of 89% or more.

15. The resin molded article according to item 14 above, wherein a heat deflection temperature (HDT) is 70° C. or higher.

16. The resin molded article according to item 14 or 15 above, wherein a total light transmittance is 91% or more.

17. The (meth)acrylic resin composition according to any one of items 1 to 10 above, comprising a phosphorus atom-containing compound (C) at Y parts by mass with respect to 100 parts by mass of the (meth)acrylic polymer (P), wherein the (meth)acrylic polymer (P) is a polymer containing (1) a repeating unit derived from methyl methacrylate at 19.95% by mass or more and 58.6% by mass or less, (2) a repeating unit derived from a (meth)acrylic acid ester (M) having an aromatic hydrocarbon group or an alicyclic hydrocarbon group having from 3 to 20 carbon atoms in a side chain at 41% by mass or more and 80% by mass or less, and (3) a repeating unit derived from a monomer (B) having two or more vinyl groups at 0.05% by mass or more and 0.40% by mass or less, and Y is represented by the following formula:

$$-0.07X+16.5 \leq Y \leq -0.07X+10.7,$$

(wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

18. A resin molded article which exhibits flame retardancy of V-0 in a vertical burning test specified in UL 94 and has a heat deflection temperature (HDT) of 90° C. or higher and a total light transmittance of 89% or more.

19. The resin molded article according to item 18 above, wherein a total light transmittance is 92% or more.

20. The (meth)acrylic resin composition according to any one of items 1 to 11, 13, and 17 above, wherein the monomer (B) is a compound having from 10 to 13 carbon atoms.

21. The (meth)acrylic resin composition according to any one of items 1 to 11, 13, and 17 above, wherein the monomer (B) is at least one kind selected from ethylene glycol di(meth)acrylate or neopentyl glycol di(meth)acrylate.

22. The (meth)acrylic resin composition according to any one of items 1 to 11, 13, 17, 20, and 21 above, wherein the phosphorus atom-containing compound (C) contains at least one kind selected from a phosphoric acid ester or a phosphonic acid ester.

23. The resin molded article according to any one of items 14 to 16, 18, and 19 above, comprising a (meth)acrylic resin composition containing a (meth)acrylic polymer containing at least one kind of a repeating unit derived from (meth)acrylic acid or a repeating unit derived from a (meth)acrylic acid ester as a main component.

24. The resin molded article according to item 12 or 23 above, wherein the (meth)acrylic resin composition contains a repeating unit derived from a monomer (B) having two or more vinyl groups.

25. The resin molded article according to any one of items 12, 23, and 24 above, wherein the (meth)acrylic resin composition contains a repeating unit derived from at least one kind selected from isobornyl acrylate or cyclohexyl acrylate.

26. The resin molded article according to any one of items 12 and 23 to 25 above, wherein the (meth)acrylic resin composition contains a phosphorus atom-containing compound (C).

27. The resin molded article according to any one of items 12 and 23 to 26 above, wherein the (meth)acrylic resin composition contains a repeating unit derived from at least one kind selected from isobornyl acrylate or cyclohexyl acrylate at 1.0 part by mass or more and 4.99 parts by mass or less with respect to 100 parts by mass of the (meth)acrylic polymer.

28. A resin molded article comprising a (meth)acrylic resin composition which exhibits noninflammability in a test by JIS K 6911 method A and has a heat deflection temperature (HDT) of 60° C. or higher.

29. The resin molded article according to item 28 above, comprising a (meth)acrylic resin composition containing a (meth)acrylic polymer (P) and a phosphorus atom-containing compound (C), wherein the (meth)acrylic polymer (P) contains (1) a repeating unit derived from methyl methacrylate at 19.95% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less, and an amount of the phosphorus atom-containing compound (C) in the (meth)acrylic resin composition is Y parts by mass with respect to 100 parts by mass of the (meth)acrylic polymer (P), wherein Y is represented by the following formulas:

$13.6 < Y \leq 35.0$ in a case of $15.0 \leq X \leq 41.4$, and $-0.07X + 16.5 < Y \leq 35.0$ in a case of $41.4 < X \leq 80.0$, (wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

30. The resin molded article according to item 28 above, comprising a (meth)acrylic resin composition containing a (meth)acrylic polymer (P) and a phosphorus atom-containing compound (C), wherein the (meth)acrylic polymer (P) contains (1) a repeating unit derived from methyl methacrylate at 19.95% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 14.6% by mass or more and 80.0% by mass or less, and (3) a repeating unit derived from a monomer (B) having two or more vinyl groups at 0.05% by mass or more and 0.40% by mass or less, and an amount of the phosphorus atom-containing compound (C) in the (meth)acrylic resin composition is Y parts by mass with respect to 100 parts by mass of the (meth)acrylic polymer (P), wherein Y is represented by the following formulas:

$5.00 \leq Y \leq 13.6$ in a case of $15.0 \leq X \leq 41.4$, and $5.00 \leq Y \leq 0.0700X + 10.7$ in a case of $41.4 < X \leq 80.0$, (wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P)).

31. The resin molded article according to item 28 above, comprising a (meth)acrylic resin composition containing a (meth)acrylic polymer (P) and a phosphorus atom-containing compound (C), wherein the (meth)acrylic polymer (P) contains (1) a repeating unit derived from methyl methacrylate at 19.95% by mass or more and 58.6% by mass or less, (2) a repeating unit derived from a (meth)acrylic acid ester (M) having an aromatic hydrocarbon group or an alicyclic hydrocarbon group having from 3 to 20 carbon atoms in a side chain at 41% by mass or more and 80% by mass or less, and (3) a repeating unit derived from a monomer (B) having two or more vinyl groups at 0.05% by mass or more and 0.40% by mass or less, and an amount of the phosphorus atom-containing compound (C) in the (meth)acrylic resin composition is Y parts by mass with respect to 100 parts by mass of the (meth)acrylic polymer (P), wherein Y is represented by the following formula:

$-0.07X + 16.5 \leq Y \leq 0.07X + 10.7$, (wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P))."

Effect of the Invention

According to the invention, it is possible to provide a resin molded article exhibiting excellent flame retardancy and heat resistance and further excellent transparency and weather resistance and a (meth)acrylic resin composition for obtaining the resin molded article. Such a resin molded article is suitable for applications which are required to exhibit high flame retardancy, heat resistance, and weather resistance such as signboards.

MODE(S) FOR CARRYING OUT THE INVENTION

Hereinafter, the invention will be described in detail. In the invention, the term "(meth)acrylate" means at least one kind selected from an "acrylate" or a "methacrylate" and the term "(meth)acrylic acid" means at least one kind selected from "acrylic acid" or "methacrylic acid".

In addition, the term "monomer" means a non-polymerized compound, and the term "repeating unit" means a unit derived from a monomer formed by polymerizing the monomer. The repeating unit may be a unit directly formed by a polymerization reaction or a unit in which a part of the unit is converted into another structure by treating the polymer.

<(Meth)Acrylic Resin Composition>

Examples of embodiments of the (meth)acrylic resin composition of the invention may include a (meth)acrylic resin composition containing a (meth)acrylic polymer (P) to be described later at 100 parts by mass and a phosphorus atom-containing compound (C) to be described later at 5.0 parts by mass or more and 35 parts by mass or less.

The flame retardancy of the resin molded article becomes favorable when the lower limit of the content of the phosphorus atom-containing compound (C) with respect to 100 parts by mass of the (meth)acrylic polymer is 5.0 parts by mass or more. In addition, the heat resistance of the resin molded article becomes favorable when the upper limit of the content of the phosphorus atom-containing compound (C) with respect to 100 parts by mass of the (meth)acrylic polymer is 35 parts by mass or less.

<Resin Molded Article>

It is possible to obtain a resin molded article (S0) exhibiting sufficient flame retardancy and sufficient heat resistance by using the (meth)acrylic resin composition of the invention.

Furthermore, it is possible to obtain a resin molded article (S1) exhibiting sufficient flame retardancy and particularly excellent heat resistance and a resin molded article (S2) exhibiting particularly excellent flame retardancy and sufficient heat resistance by combining the contents of the (meth)acrylic acid ester (M) and the phosphorus atom-containing compound (C) in the following manner according to the intended application and purpose of the resin molded article. Furthermore, it is possible to obtain a resin molded article (S3) exhibiting both particularly excellent flame retardancy and heat resistance from among the resin molded articles (S1) or the resin molded articles (S2)

<Resin Molded Article (S0)>

It is possible to obtain the resin molded articles (S0) exhibiting sufficient flame retardancy and sufficient heat resistance as the (meth)acrylic resin composition is a resin composition containing a (meth)acrylic polymer (P) at 100 parts by mass and a phosphorus atom-containing compound (C) at 5.0 parts by mass or more and 35 parts by mass or less and the (meth)acrylic polymer (P) is a polymer containing (1) a repeating unit derived from methyl methacrylate at 20.0% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less.

However, the lower limit value, 20% by mass, of the amount of the repeating unit derived from methyl methacrylate is a value in which the amount of the repeating unit derived from the monomer (B) is not considered, and substantially it is preferable to adopt the value obtained by subtracting the amount of the repeating unit that is derived from the monomer (B) and actually contained from this 20% by mass as the lower limit value. A substantially preferred lower limit value is 19.95% by mass.

<Resin Molded Article (S1)>

It is possible to obtain the resin molded article (S1) exhibiting sufficient flame retardancy and particularly excellent heat resistance by setting the content Y of the phosphorus atom-containing compound (C) in the (meth)acrylic resin composition to be in the range represented by the following formulas.

$$5.00 \leq Y \leq 13.6 \text{ in a case of } 15.0 \leq X \leq 41.4$$

$$5.00 \leq Y \leq 0.0700X + 10.7 \text{ in a case of } 41.4 < X \leq 80.0$$

(where, X (unit: parts by mass) is the content of the repeating unit which is derived from the (meth)acrylic acid ester (M) and contained in the (meth)acrylic polymer (P) with respect to 100 parts by mass of the (meth)acrylic polymer (P).)

A resin molded article exhibiting excellent flame retardancy is obtained when the lower limit of the content of the phosphorus atom-containing compound (C) with respect to 100 parts by mass of the (meth)acrylic polymer (P) is 5.0 parts by mass or more. In addition, a resin molded article exhibiting excellent heat resistance is obtained when the upper limit of the content of the phosphorus atom-containing compound (C) with respect to 100 parts by mass of the (meth)acrylic polymer is 13.6 parts by mass or less (in the case of $15.0 \leq X \leq 41.4$) or 0.07X+10.7 parts by mass or less (in the case of $41.4 < X \leq 80$). In addition, regardless of the value of X, the lower limit of the content of the phosphorus atom-containing compound (C) with respect to 100 parts by mass of the (meth)acrylic polymer (P) is more preferably 6.5 parts by mass or more, and the upper limit is more preferably 10.5 parts by mass or less.

<Resin Molded Article (S2)>

It is possible to obtain the resin molded article (S2) exhibiting particularly excellent flame retardancy and sufficient heat resistance by setting the content Y of the phosphorus atom-containing compound (C) in the (meth)acrylic resin composition to be in the range represented by the following formulas.

$$13.6 < Y \leq 35.0 \text{ in a case of } 15.0 \leq X \leq 41.4$$

$$-0.07X + 16.5 < Y \leq 35.0 \text{ in a case of } 41.4 < X \leq 80.0$$

(where, X (unit: parts by mass) is the content of the repeating unit which is derived from the (meth)acrylic acid ester (M) and contained in the (meth)acrylic polymer (P) with respect to 100 parts by mass of the (meth)acrylic polymer (P).)

The lower limit of the content of the phosphorus atom-containing compound (C) in the methacrylic resin composition is preferably more than 13.6 parts by mass (in the case of $15 \leq X \leq 41.4$) or $-0.07X+16.5$ parts by mass or more (in the case of $41.4 < X \leq 80$) and more preferably 20 parts by mass or more with respect to 100 parts by mass of the (meth)acrylic polymer (P) since the flame retardancy of the resin molded article becomes favorable. In addition, the upper limit of the content is preferably 35 parts by mass or less and more preferably 30 parts by mass or less with respect to 100 parts by mass of the (meth)acrylic polymer (P) since the heat resistance of the resin molded article becomes favorable. The upper limit value and lower limit value described above may be arbitrarily combined.

<Resin Molded Article (S3)>

It is possible to obtain the resin molded article (S3) exhibiting both particularly excellent flame retardancy and heat resistance by setting the content Y of the phosphorus atom-containing compound (C) in the (meth)acrylic resin composition to be in the range represented by the following formula.

$$-0.07X+16.5 \le Y \le 0.07X+10.7$$

(where, X (unit: parts by mass) is the content of the repeating unit which is derived from the (meth)acrylic acid ester (M) and contained in the (meth)acrylic polymer (P) with respect to 100 parts by mass of the (meth)acrylic polymer (P).)

A resin molded article exhibiting excellent flame retardancy is obtained when the lower limit of the content of the phosphorus atom-containing compound (C) with respect to 100 parts by mass of the (meth)acrylic polymer (P) is $-0.07X+16.5$ parts by mass or more. In addition, a resin molded article exhibiting excellent heat resistance is obtained when the upper limit of the content of the phosphorus atom-containing compound (C) with respect to 100 parts by mass of the (meth)acrylic polymer (P) is $10.07X+10.7$ parts by mass or less.

In the resin molded article (S3), the (meth)acrylic polymer (P) is a polymer containing the following (1) to (3) when the content Y of the phosphorus atom-containing compound (C) is in the range of the above formula.

(1) A repeating unit derived from methyl methacrylate at 20% by mass or more and 59% by mass or less, (2) a repeating unit derived from a (meth)acrylic acid ester (M) having an aromatic hydrocarbon group or an alicyclic hydrocarbon group having from 3 to 20 carbon atoms in a side chain at 41% by mass or more and 80% by mass or less, and (3) a repeating unit derived from a monomer (B) having two or more vinyl groups at 0.05% by mass or more and 0.40% by mass or less.

However, the lower limit value, 20% by mass, and upper limit value, 59% by mass, of the amount of the repeating unit derived from methyl methacrylate are values in which the amount of the repeating unit derived from the monomer (B) is not considered, and substantially it is preferable to adopt values obtained by subtracting the amount of the repeating unit that is derived from the monomer (B) and actually contained from these upper limit value and lower limit value as the upper limit value and the lower limit value, respectively. From this point of view, the substantially preferred amount of the repeating unit derived from methyl methacrylate is 19.95% by mass or more and 58.6% by mass or less.

<(Meth)Acrylic Polymer (P)>

The (meth)acrylic resin composition of the invention contains the following (meth)acrylic polymer (P) as one of the constituents. It is possible to obtain a (meth)acrylic resin molded article exhibiting excellent heat resistance and flame retardancy by synergistic effect of the (meth)acrylic polymer (P) with other constituents to be described later as the (meth)acrylic polymer (P) is contained as one of the constituents.

The (meth)acrylic polymer (P) is a polymer containing the following (1) to (3).

(1) A repeating unit derived from methyl methacrylate at 20.0% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less.

The lower limit of the content of the repeating unit derived from methyl methacrylate is not particularly limited, but it is preferably 20% by mass or more since the impact resistance and mechanical strength of the resin molded article become favorable. However, this lower limit value, 20% by mass, is a value in which the amount of the repeating unit derived from the monomer (B) is not considered, and substantially it is preferable to adopt the value obtained by subtracting the amount of the repeating unit that is derived from the monomer (B) and actually contained from this 20% by mass as the lower limit value. A substantially preferred lower limit value is 19.95% by mass. In addition, the upper limit of the content is not particularly limited, but it is preferably 84.95% by mass or less and still more preferably 79.1% by mass or less since the flame retardancy of the resin molded article becomes favorable. The upper limit value and lower limit value described above may be arbitrarily combined.

The lower limit of the content of the repeating unit derived from the monomer (B) is not particularly limited, but it is preferably 0.05 part by mass or more and more preferably 0.12 part by mass or more since the flame retardancy of the resin molded article becomes favorable. In addition, the upper limit of the content is not particularly limited, but it is preferably 0.40 part by mass or less and more preferably 0.36 part by mass or less since the impact resistance and mechanical strength of the resin molded article become favorable. The upper limit value and lower limit value described above may be arbitrarily combined. Incidentally, the specific monomer (B) will be described later.

<(Meth)Acrylic Acid Ester (M)>

In the invention, the (meth)acrylic acid ester (M) is a monofunctional (meth)acrylic acid ester having an aromatic hydrocarbon group or an alicyclic hydrocarbon group having from 3 to 20 carbon atoms in a side chain. The flame retardancy of the resin molded article becomes favorable as the (meth)acrylic acid ester (M) is contained.

Specific examples thereof may include (meth)acrylic acid esters such as cyclohexyl (meth)acrylate, bornyl (meth)acrylate, norbornyl (meth)acrylate, isobornyl (meth)acrylate, adamantyl (meth)acrylate, dimethyladamantyl (meth)acrylate, methylcyclohexyl (meth)acrylate, norbornylmethyl (meth)acrylate, menthyl (meth)acrylate, fenchyl (meth)acrylate, dicyclopentanyl (meth)acrylate, dicyclopentenyl (meth)acrylate, dicyclopentenyloxyethyl (meth)acrylate, cyclodecyl (meth)acrylate, 4-t-butylcyclohexyl(meth)acrylate, trimethylcyclohexyl (meth)acrylate, benzyl (meth)acrylate, and phenoxyethyl (meth)acrylate and any derivative thereof. These may be used singly or two or more kinds thereof may be used concurrently.

The (meth)acrylic acid ester (M) is converted into a methacrylic acid structural unit as the side chain is eliminated when heat is applied to the (meth)acrylic acid ester (M). This methacrylic acid structural unit acts with the phosphorus atom-containing compound (C) and the synergistic effect thereof increases the amount of carbide (char) generated. In addition, the generation of char is further promoted as the monomer (B) having two or more vinyl groups is added. The carbide (char) enhances the flame retardancy of the resin composition. Meanwhile, the side chain eliminated is likely to consume oxygen, the combustion field thus falls in an oxygen-deficient state, and the flame retardancy of the resin composition is further enhanced.

The lower limit of the content of the repeating unit derived from the (meth)acrylic acid ester (M) is not particularly limited, but it is preferably 15.0% by mass or more and more preferably 20.5% by mass or more since the flame retardancy of the resin molded article becomes favorable. The content is preferably 80.0% by mass or less, more preferably 60.0% by mass or less, still more preferably 25.0% by mass or less since the impact resistance and mechanical strength of the resin molded article become favorable.

As the (meth)acrylic polymer (P) containing the (meth)acrylic acid ester (M), it is possible to use a (meth)acrylic polymer (P) containing a repeating unit derived from a methacrylic acid ester (M1) having an aromatic hydrocarbon group or an alicyclic hydrocarbon group having from 3 to 20 carbon atoms in a side chain and a repeating unit derived from an acrylic acid ester (M2) having an aromatic hydrocarbon group or an alicyclic hydrocarbon group having from 3 to 20 carbon atoms in a side chain.

In addition, the methacrylic acid ester (M1) and the acrylic acid ester (M2) interact with the phosphorus atom-containing compound (C) to have an effect of synergistically enhancing the flame retardancy improving effect by the phosphorus atom-containing compound (C), and the flame retardancy of the resin molded article can be thus improved.

In addition, as the acrylic acid ester (M2) is contained, the amount of unreacted monomers in the (meth)acrylic resin composition after polymerization decreases and the weather resistance of the resin molded article obtained becomes favorable.

As the (meth)acrylic polymer (P) containing the (meth)acrylic acid ester (M), it is possible to use a (meth)acrylic polymer (P) which contains a repeating unit derived from the methacrylic acid ester (M1) having an aromatic hydrocarbon group or an alicyclic hydrocarbon group having from 3 to 20 carbon atoms in a side chain at 10.0% by mass or more and 79.5% by mass or less and a repeating unit derived from the acrylic acid ester (M2) having an aromatic hydrocarbon group or an alicyclic hydrocarbon group having from 3 to 20 carbon atoms in a side chain at 0.50% by mass or more and 20.0% by mass or less and has the sum of the repeating unit derived from the methacrylic acid ester (M1) and the repeating unit derived from the acrylic acid ester (M2) of 15.0% by mass or more and 80.0% by mass.

The lower limit of the content of the repeating unit derived from the methacrylic acid ester (M1) is not particularly limited, but it is preferably 10.0% by mass or more and more preferably 20.0% by mass or more since the flame retardancy and heat resistance of the resin molded article become favorable. In addition, the upper limit of the content is not particularly limited, but it is preferably 79.5% by mass or less and more preferably 70.0% by mass or less since the weather resistance of the resin molded article becomes favorable. The upper limit value and lower limit value described above may be arbitrarily combined.

The lower limit of the content of the repeating unit derived from the acrylic acid ester (M2) is not particularly limited, but it is preferably 0.50% by mass or more and more preferably 1.0% by mass or more since the flame retardancy and weather resistance of the resin molded article become favorable. The upper limit of the content is not particularly limited, but it is preferably 20% by mass or less and more preferably 6.0% by mass or less since the heat resistance of the resin molded article becomes favorable. The upper limit value and lower limit value described above may be arbitrarily combined.

The lower limit of the sum of the content of the repeating unit derived from the methacrylic acid ester (M1) and the content of the repeating unit derived from the acrylic acid ester (M2) is not particularly limited, but it is preferably 15.0% by mass or more and more preferably 20.5% by mass or more since the flame retardancy of the resin molded article becomes favorable. The upper limit of the contents is not particularly limited, but it is preferably 80.0% by mass or less since the heat resistance and weather resistance of the resin molded article become favorable. The upper limit value and lower limit value described above may be arbitrarily combined.

In the (meth)acrylic resin composition of the invention, it is possible to use a methacrylic acid ester homopolymer having a glass transition temperature of 45° C. or higher and 200° C. or lower as the methacrylic acid ester (M1). The lower limit of the glass transition temperature of the methacrylic acid ester (M1) is preferably 45° C. or higher and more preferably 60° C. or higher since the flame retardancy and heat resistance of the resin molded article become favorable. The upper limit of the glass transition temperature is preferably 200° C. or lower and more preferably 180° C. or lower since the moldability of the resin molded article becomes favorable. The upper limit value and lower limit value described above may be arbitrarily combined.

Examples of such a methacrylic acid ester (M1) may include dicyclopentanyl methacrylate (glass transition temperature of homopolymer: 175° C.), isobornyl methacrylate (180.0° C.), cyclohexyl methacrylate (66 to 83° C.), and benzyl methacrylate (54.0° C.), but it is not limited thereto. Among them, isobornyl methacrylate and cyclohexyl methacrylate are still more preferable since they have a particularly excellent effect of improving the flame retardancy without impairing the heat resistance of the resin molded article.

In the (meth)acrylic resin composition of the invention, it is possible to use an acrylic acid ester homopolymer having a glass transition temperature of 3° C. or higher and 145° C. or lower as the acrylic acid ester (M2). The lower limit of the glass transition temperature of the acrylic acid ester (M2) is preferably 3° C. or higher and more preferably 15° C. or higher since the flame retardancy and heat resistance of the resin molded article become favorable. The upper limit of the glass transition temperature is not particularly limited, but it is preferably 145° C. or lower and more preferably 115° C. or lower since the heat resistance and moldability of the resin molded article become favorable. The acrylic acid ester homopolymer (E) having a glass transition temperature of 15° C. or higher and 115° C. or lower is still more preferable. The upper limit value and lower limit value described above may be arbitrarily combined.

Examples of such a acrylic acid ester (M2) may include dicyclopentanyl acrylate (glass transition temperature of homopolymer: 120° C.), isobornyl acrylate (97.0° C.), cyclohexyl acrylate (18.9° C.), and benzyl acrylate (5.9° C.), but it is not limited thereto. Among them, at least one kind (monomer D) selected from isobornyl acrylate or cyclohexyl acrylate is still more preferable since it has an action of decreasing the amount of unpolymerized reactant of the methacrylic acid ester (M1) and the effect of improving the weather resistance of the resin molded article in the case of being concurrently used with the methacrylic acid ester (M1) as well as it has the effect of improving the flame retardancy of the resin molded article.

In the (meth)acrylic resin composition of the invention, the lower limit of the content of the repeating unit derived from the acrylic acid ester homopolymer (E) of the (meth)acrylic polymer (P) is not particularly limited, but it is preferably 1.0% by mass or more and more preferably 2.0% by mass or more since the flame retardancy and weather resistance of the resin molded article become favorable. Meanwhile, the upper limit of the content is not particularly limited, but it is preferably 4.99% by mass or less and more preferably 4.0% by mass or less since the heat resistance of the resin molded article becomes favorable. The upper limit value and lower limit value described above may be arbitrarily combined.

In the (meth)acrylic resin composition of the invention, it is possible to use at least one kind selected from cyclohexyl methacrylate or isobornyl methacrylate as the methacrylic acid ester (M1) from the viewpoint of an excellent effect of improving the flame retardancy and flame resistance.

In the (meth)acrylic resin composition of the invention, it is possible to use at least one kind selected from cyclohexyl acrylate or isobornyl acrylate (hereinafter, referred to as the "monomer (D)") as the acrylic acid ester (M2) from the viewpoint of excellent effect of improving the flame retardancy and weather resistance.

As the monomer (D) is contained, the amount of unreacted monomers in the (meth)acrylic resin composition after polymerization can be further decreased and the weather resistance of resin molded article becomes more favorable. Furthermore, the monomer (D) interacts with the phosphorus atom-containing compound to have an effect of synergistically enhancing the flame retardancy improving effect by the phosphorus atom-containing compound and the flame retardancy of the resin molded article can be thus improved.

The lower limit of the content of the monomer (D) is not particularly limited, but it is preferable to set the content to 1.0% by mass or more with respect to 100% parts by mass of the (meth)acrylic polymer (P) since the flame retardancy and weather resistance of the resin molded article can become more favorable, and it is more preferably 2.0% by mass or more. Meanwhile, the upper limit of the content is not particularly limited, but it is preferable that the content is 4.99% by mass or less since the heat resistance of the resin molded article can be further improved, and it is more preferably 4.0% by mass or less. The upper limit value and lower limit value described above may be arbitrarily combined.

<Monomer (B)>

The monomer (B) is a monomer having two or more vinyl groups, and it is one of the constituents of the (meth)acrylic resin composition of the invention. It is possible to further improve the flame retardancy of the resin molded article by containing the monomer (B) in the (meth)acrylic resin composition.

As the monomer (B), a bifunctional (meth)acrylate is preferable. Examples thereof may include alkanediol di(meth)acrylates such as ethylene glycol di(meth)acrylate, 1,2-propylene glycol di(meth)acrylate, 1,3-butylene glycol di(meth)acrylate, 1,6-hexanediol di(meth)acrylate, neopentyl glycol di(meth)acrylate, tricyclodecanedimethanol di(meth)acrylate. These may be used singly or two or more kinds thereof may be used concurrently.

Among the monomers (B) described above, a monomer having from 10 to 14 carbon atoms can improve the workability at the time of producing the (meth)acrylic resin composition since the raw material for the monomer exhibits favorable handling properties.

Furthermore, at least one kind of monomer selected from ethylene glycol di(meth)acrylate or neopentyl glycol di(meth)acrylate is preferable from the viewpoint of being able to further improve the flame retardancy of the resin molded article in addition to excellent handling properties of the raw material.

<Copolymerizable Monomer>

In the invention, it is possible to contain a monomer copolymerizable with methyl methacrylate and the (meth)acrylic acid ester (M) in the (meth)acrylic polymer (P) in a range of from 0 to 12% by mass and preferably from 0.8 to 9.0% by mass with respect to 100% by mass of (meth)acrylic polymer (P) if necessary.

Examples of the monomer copolymerizable with methyl methacrylate and the (meth)acrylic acid ester (M) may include ethyl (meth)acrylate, isopropyl (meth)acrylate, t-butyl (meth)acrylate, isobutyl (meth)acrylate, n-butyl (meth)acrylate, unsaturated carboxylic acids such as (meth)acrylic acid, maleic acid, and itaconic acid, acid anhydrides such as maleic anhydride and itaconic anhydride, maleimide derivatives such as N-phenylmaleimide and N-cyclohexylmaleimide, vinyl esters such as vinyl acetate and vinyl benzoate, vinyl chloride, vinylidene chloride, and any derivative thereof, nitrogen-containing monomers such as methacrylamide and acrylonitrile, epoxy group-containing monomers such as (meth)acrylic acid glycidyl acrylate, and aromatic vinyl compounds such as styrene and α-methylstyrene.

<Phosphorus Atom-Containing Compound (C)>

In the invention, it is preferable that the (meth)acrylic resin composition contains a phosphorus atom-containing compound as one of the constituents in order to enhance the flame retardancy of the resin molded article. A flame retardancy synergistic effect is obtained as the phosphorus atom-containing compound having a flame retardancy improving effect is used concurrently with the monomer (B) and the monomer (D), and the flame retardancy of the resin molded article can be thus improved.

Examples of the phosphorus atom-containing compound (C) may include a phosphoric acid ester-based compound (hereinafter, abbreviated as the "phosphoric acid ester") or a phosphonic acid ester-based compound (hereinafter, abbreviated as the "phosphonic acid ester"). Specifically, the following compounds can be exemplified, but it is not limited thereto. These compounds may be used singly or two or more kinds thereof may be used concurrently.

1) Halogen-free phosphoric acid ester:

Aromatic phosphoric acid esters such as monoethyl phosphate, monobutyl phosphate, methyl acid phosphate, ethyl acid phosphate, butyl acid phosphate, dibutyl phosphate, trimethyl phosphate (TMP), triethyl phosphate (TEP), triphenyl phosphate (TPP), tricresyl phosphate (TCP), trixylenyl phosphate (TXP), cresyl diphenyl phosphate (CDP), and 2-ethylhexyl diphenyl phosphate (EHDP) and any derivative compound thereof or any condensate thereof.

Reaction product of phosphorus oxychloride with a divalent phenolic compound and phenol (or alkylphenol). For example, aromatic condensed phosphoric acid esters such as resorcinol bis-diphenyl phosphate, resorcinol bis-dixylenyl phosphate, and bisphenol A bis-diphenyl phosphate and any derivative compound thereof or any condensate thereof.

2) Halogen-containing phosphoric acid ester: tris(chloroethyl) phosphate, tris(chloropropyl) phosphate, tris(dichloropropyl) phosphate, tris(dibromopropyl) phosphate, bis(2,3-dibromopropyl)-2,3-dichloropropyl phosphate, bis(chloropropyl)octyl phosphate, and the like and any derivative compound thereof or any condensate thereof.

3) Phosphonic acid ester: dimethyl vinylphosphonate, diethyl vinylphosphonate, diphenyl vinylphosphonate, and diphenylvinylphosphine oxide, and the like and any derivative compound thereof or any condensate thereof.

As the halogen-free phosphoric acid ester, it is possible to use commercially available products such as the "JAMP-2", "JAMP-4P", "JP-501", "JP-502", "JP-504", and "DBP" manufactured by JOHOKU CHEMICAL CO., LTD. and the "TMP", "TEP", "TPP", "TCP", "TXP", "CDP", "PX-110", "#41", "CR-733S", "CR-741", "PX-200", and "DAI-GUARD-400/540/580/610" manufactured by DAIHACHI CHEMICAL INDUSTRY CO., LTD., and as the halogen-containing phosphoric acid ester, it is possible to use commercially available products such as the "TMCPP", "CRP", "CR-900", "CR-504L", "CR-570", and "DATGUARD-540" manufactured by DAIHACHI CHEMICAL INDUSTRY CO LTD.

As the phosphonic acid ester, for example, it is possible to use commercially available products such as the "V series" manufactured by KATAYAMA CHEMICAL INDUSTRIES CO., LTD. and the "NONNEN 73" manufactured by MARUBISHI OIL CHEMICAL CO., LTD.

<Method of Producing (Meth)Acrylic Resin Composition>

Examples of the method of obtaining the (meth)acrylic resin composition may include the following three Production Examples.

Production Example 1

A method of obtaining the (meth) acrylic resin composition by adding 5.0 parts by mass or more and 35 parts by mass or less of the phosphorus atom-containing compound (C) to 100 parts by mass of the (meth)acrylic polymer (P) and mixing them together. However, the content of the phosphorus atom-containing compound (C) can be appropriately adjusted according to the resin molded articles S1 to S3 described above.

Production Example 2

A method of obtaining the (meth)acrylic resin composition by polymerizing a polymerizable composition (X1) to be described below.

Production Example 3

A method of obtaining the (meth)acrylic resin composition by polymerizing a polymerizable composition (X2) to be described below.

In the invention, the method of obtaining the (meth) acrylic resin composition by polymerizing a polymerizable composition (X2) of Production Example 3 is preferable from the viewpoint of favorable productivity.

<Polymerizable Composition (X1)>

The polymerizable composition (X1) is an embodiment of a raw material for obtaining the (meth)acrylic resin composition, and it is a composition containing a monomer composition (A1) to be described later at 100 parts by mass, the monomer (B) at 0.05 part by mass or more and 0.40 part by mass or less, and the phosphorus atom-containing compound (C) at 5.0 parts by mass or more and 35 parts by mass or less. However, the content of the phosphorus atom-containing compound (C) can be appropriately adjusted according to the resin molded articles S1 to S3 described above.

<Method of Producing Polymerizable Composition (X1)>

Examples of the radical polymerization initiator to be used when polymerizing the polymerizable compositions (X1) and (X1') to obtain the (meth)acrylic resin composition may include azo compounds such as 2,2'-azobis(isobutyronitrile) and 2,2'-azobis(2,4-dimethylvaleronitrile) and peroxides such as benzoyl peroxide and lauroyl peroxide.

In the invention, it is possible to concurrently use a promoter such as amine or mercaptan together with the radical polymerization initiator if necessary.

Examples of the polymerizable composition (X1) may include one using a monomer composition (A1) to be described later.

The polymerization temperature when polymerizing the polymerizable composition (X1) is appropriately set to be in a range of from 20 to 150° C. usually according to the kind of the radical polymerization initiator to be used. In addition, the polymerizable composition (X1) can be polymerized under multistage temperature conditions if necessary.

Examples of the polymerization method of the polymerizable composition (X1) may include a bulk polymerization method, a suspension polymerization method, an emulsion polymerization method, and a dispersion polymerization method, and among these, from the viewpoint of productivity, a bulk polymerization method is preferable and a cast polymerization (cast polymerization) method is more preferable among the bulk polymerization methods.

In the case of obtaining the (meth)acrylic resin composition by a cast polymerization method, for example, the (meth)acrylic resin composition can be obtained by injecting the polymerizable composition (X1) into a mold and polymerizing it.

As the mold, for example, it is possible to use one obtained by sandwiching a sealing material such as a soft vinyl chloride resin tube between the end portions of a SUS plate in the space portion between two SUS plates. The interval of the voids of the mold is appropriately adjusted so as to obtain a resin plate having a desired thickness, but it is generally from 1 to 30 mm.

<Polymerizable Composition (X2)>

The polymerizable composition (X2) is an embodiment of a raw material for obtaining the (meth)acrylic resin composition, and it is a composition containing a polymerizable monomer composition (A1') to be described later at 100 parts by mass, the monomer (B) at 0.05 part by mass or more and 0.4 part by mass or less, and the phosphorus atom-containing compound (C) at 5.0 parts by mass or more and 35 parts by mass or less. However, the content of the phosphorus atom-containing compound (C) can be appropriately adjusted according to the resin molded articles S1 to S3 described above.

Examples of the polymerizable composition (X2) may include those using a monomer composition (A1') using a polymer (A1") obtained by using a monomer composition (a'2) as a monomer composition (a1') to be described later and a monomer composition (a"2) as a monomer composition (a1") to be described later.

<Method of Producing Polymerizable Composition (X2)>

Examples of the radical polymerization initiator to be used when polymerizing the polymerizable composition (X2) may include the same one as the radical polymerization initiator to be used when polymerizing the polymerizable composition (X1).

In the invention, it is possible to concurrently use a promoter such as amine or mercaptan together with the radical polymerization initiator if necessary.

Examples of the polymerization temperature when polymerizing the polymerizable composition (X2) may include the same condition as the temperature condition when polymerizing the polymerizable composition (X1).

Examples of the polymerization method of the polymerizable composition (X2) may include the same method as the polymerization method when polymerizing the polymerizable composition (X1). In the invention, from the viewpoint of productivity, a bulk polymerization method is preferable, and a cast polymerization (cast polymerization) method is more preferable among the bulk polymerization methods.

In the case of obtaining the (meth)acrylic resin composition by a cast polymerization method, it is possible to obtain the (meth)acrylic resin composition by injecting the polymerizable compositions (X2) and (X2') into a mold and polymerizing them.

As the mold, for example, it is possible to use one obtained by sandwiching a sealing material such as a soft vinyl chloride resin tube between the end portions of a SUS plate in the space portion between two SUS plates. The interval of the voids of the mold is appropriately adjusted so as to obtain a resin plate having a desired thickness, but it is generally from 1 to 30 mm.

<Monomer Composition (A1)>

The monomer composition (A1) is a monomer composition containing methyl methacrylate at 20.0% by mass or more and 85.0% by mass or less and the (meth)acrylic acid ester (M) at 15.0% by mass or more and 80.0% by mass or less. Incidentally, in the invention, the term "% by mass" means the content of a predetermined component contained in 100% by mass of the total amount.

In addition, the weather resistance and flame retardancy of resin molded article can be improved as the (meth)acrylic acid ester (M) contains the monomer (D). The content of the monomer (D) can be set to 1.0 part by mass or more and 4.99 parts by mass or less.

<Polymerizable Monomer Composition (A1')>

The polymerizable monomer composition (A1') is a monomer composition containing the polymer (A1") to be described later at 5.0% by mass or more and 45% by mass or less and a monomer composition (a1') at 55% by mass or more and 95% by mass or less.

Examples of the polymerizable monomer composition (A1') may include one obtained by dissolving the polymer (A1") in the monomer composition (a1') or one obtained by partially polymerizing the monomer composition (A1) described above, and one in the form of a liquid exhibiting viscosity (hereinafter, referred to as "syrup").

In the invention, the monomer (B) described above can be added when partially polymerizing the monomer composition (A1).

Examples of the method of obtaining the syrup may include a method in which a radical polymerization initiator is added to the monomer composition (A1) to prepare a polymerizable raw material and a part thereof is polymerized.

Specific examples of the radical polymerization initiator may include azo-based polymerization initiators such as 2,2'-azobis(4-methoxy-2,4-dimethylvaleronitrile), 2,2'-azobisisobutyronitrile, and 2,2'-azobis-(2,4-dimethylvaleronitrile) and organic peroxide-based polymerization initiators such as lauroyl peroxide, diisopropyl peroxydicarbonate, benzoyl peroxide, bis(4-t-butylcyclohexyl) peroxydicarbonate, t-butyl peroxyneodecanoate, and t-hexyl peroxypivalate. These may be used singly or two or more kinds thereof may be used concurrently.

The amount of the radical polymerization initiator added can be appropriately determined according to the purpose, but it is usually 0.01 part by mass or more and 0.5 part by mass or less with respect to 100 parts by mass of the monomer in the monomer composition (A1).

<Polymer (A1")>

The polymer (A1") is obtained by polymerizing a monomer composition (a1") to be described later, and as an embodiment, examples of the monomer composition (a1") may include a monomer composition (a'2) containing methyl methacrylate at 20% by mass or more and 85.0% by mass or less and the (meth)acrylic acid ester (M) at 15% by mass or more and 80% by mass or less.

Examples of the polymerization method of the polymer (A1") may include a bulk polymerization method, a suspension polymerization method, an emulsion polymerization method, and a dispersion polymerization method.

<Monomer Composition (a1')>

The monomer composition (a1') is a monomer composition containing methyl methacrylate and the (meth)acrylic acid ester (M). (However, the (meth)acrylic acid ester (M) contains the monomer (D).)

Examples of the monomer composition (a1') may include the monomer composition (a'2) containing methyl methacrylate at 20% by mass or more and 85.0% by mass or less and the (meth)acrylic acid ester (M) at 15% by mass or more and 80% by mass or less.

<Monomer Composition (a1")>

The monomer composition (a1") is a monomer composition containing methyl methacrylate and the (meth) acrylic acid ester (M). (However, the (meth)acrylic acid ester (M) contains the monomer (D).)

The monomer composition (a1") may have a composition the same as or different from the composition of the monomer composition (A1), and the composition thereof can be determined according to the purpose. Examples of the composition of the monomer composition (a1") may include a monomer composition (a"2) containing methyl methacrylate at 20% by mass or more and 85.0% by mass or less and the (meth)acrylic acid ester (M) at 15% by mass or more and 80% by mass or less.

<Method of Producing Resin Molded Article>

The resin molded article can be obtained by the following two methods, for example.

(1) A method in which either of the polymerizable composition (X1) or the polymerizable composition (X2) is injected into a mold and cast polymerized, and the polymerized product is then removed from the mold to obtain the resin molded article (2) A method in which a pellet of the (meth)acrylic resin composition of the invention is subjected to a melt molding such as extrusion molding or injection molding to obtain the resin molded article <Resin Molded Article>

In general, the heat resistance of the resin molded article has a relationship of the so-called trade-off with flame retardancy that the heat resistance tends to decrease as the flame retardancy is improved. In other words, the resin molded article of the invention is a resin molded article exhibiting remarkable properties that flame retardancy and heat resistance that are contradictory properties are both achieved.

The resin molded article of the invention can be formed as a resin molded article (F0) which exhibits noninflammability in the test by JIS K 6911 method A and satisfies a heat deflection temperature (HDT) of 60° C. or higher. Such a resin molded article can be produced, for example, by molding a resin composition satisfying the requirements described in claims 1 to 10 by a known method.

It is preferable that the resin molded article exhibits noninflammability in the test by JIS K 6911 method A from the viewpoint of safety since it is possible to prevent fire spreading and burning down at the time of fire breaking. In addition, with regard to the heat resistance, it is preferable that the heat deflection temperature (HDT) measured in conformity with JIS K 7191 is 60° C. or higher from the viewpoint of being able to suppress deformation of the resin molded article when being exposed to a high temperature environment.

It is possible to obtain a resin molded article exhibiting flame retardancy of the V-0 class in the vertical burning test specified in UL 94 as the resin molded article (F0) is formed from a (meth)acrylic resin composition containing a (meth)acrylic polymer (P) and a phosphorus atom-containing compound (C), the (meth)acrylic polymer (P) is a polymer containing (1) a repeating unit derived from methyl methacrylate at 20.0% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less, and the resin molded article contains the phosphorus atom-containing compound (C) at $Y_1$ parts by mass with respect to 100 parts by mass of the (meth)acrylic polymer (P), where $Y_1$ is represented by the following formulas.

$$13.6 < Y_1 \leq 35.0 \text{ in a case of } 15.0 \leq X \leq 41.4$$

$$-0.07X + 16.5 < Y_1 \leq 35.0 \text{ in a case of } 41.4 < X \leq 80.0$$

(X is as described above.)

However, the lower limit value, 20% by mass, of the amount of the repeating unit derived from methyl methacrylate is a value in which the amount of the repeating unit derived from the monomer (B) is not considered, and substantially it is preferable to adopt the value obtained by subtracting the amount of the repeating unit that is derived from the monomer (B) and actually contained from this 20% by mass as the lower limit value. The substantially preferred lower limit value is 19.95% by mass.

It is preferable that the resin molded article exhibits flame retardancy of the V-0 class in the vertical burning test specified in UL 94 from the viewpoint of safety since burning of the resin molded article does not continue even when being brought into contact with the flame at the time of fire breaking. Such a resin molded article can be produced, for example, by using a resin composition satisfying the requirements described in claim 13.

In addition, it is possible to obtain a resin molded article exhibiting heat resistance having a heat deflection temperature (HDT) of 90° C. or higher as the resin molded article (F0) is formed from a (meth)acrylic resin composition containing a (meth)acrylic polymer (P) and a phosphorus atom-containing compound (C), the (meth)acrylic polymer (P) is a polymer containing (1) a repeating unit derived from methyl methacrylate at 20.0% by mass or more and 84.95% by mass or less, (2) a repeating unit derived from a (meth)acrylic acid ester (M) having an aromatic hydrocarbon group or an alicyclic hydrocarbon group having from 3 to 20 carbon atoms in a side chain at 15.0% by mass or more and 80.0% by mass or less, and (3) a repeating unit derived from a monomer (B) having two or more vinyl groups at 0.05% by mass or more and 0.40% by mass or less, and the resin molded article contains the phosphorus atom-containing compound (C) at $Y_2$ parts by mass with respect to 100 parts by mass of the (meth)acrylic polymer (P), where $Y_2$ is represented by the following formulas.

$$5.00 \leq Y_2 \leq 13.6 \text{ in a case of } 15.0 \leq X \leq 41.4$$

$$5.00 \leq Y_2 \leq 0.0700X + 10.7 \text{ in a case of } 41.4 < X \leq 80.0$$

(X is as described above.)

Incidentally, the lower limit value, 20% by mass, of the amount of the repeating unit derived from methyl methacrylate is the same as that described above.

Such a resin molded article can be produced, for example, by using a resin composition satisfying the requirements described in claim 11.

In addition, it is possible to obtain a resin molded article exhibiting flame retardancy of the V-0 class in the vertical burning test specified in UL 94 and heat resistance having a heat deflection temperature (HDT) of 90° C. or higher as the resin molded article (F0) is formed from a (meth)acrylic resin composition containing a (meth)acrylic polymer (P) and a phosphorus atom-containing compound (C), the (meth)acrylic polymer (P) is a polymer containing (1) a repeating unit derived from methyl methacrylate at 20% by mass or more and 59% by mass or less, (2) a repeating unit derived from a (meth)acrylic acid ester (M) having an aromatic hydrocarbon group or an alicyclic hydrocarbon group having from 3 to 20 carbon atoms in a side chain at 41% by mass or more and 80% by mass or less, and (3) a repeating unit derived from a monomer (B) having two or more vinyl groups at 0.05% by mass or more and 0.40% by mass or less, and the resin molded article contains the phosphorus atom-containing compound (C) at $Y_3$ parts by mass with respect to 100 parts by mass of the (meth)acrylic polymer (P), where $Y_3$ is represented by the following formula.

$$-0.07X + 16.5 \leq Y \leq 0.07X + 10.7,$$

(X is as described above.)

However, the lower limit value, 20% by mass, and the upper limit value, 59% by mass, of the amount of the repeating unit derived from methyl methacrylate are values in which the amount of the repeating unit derived from the monomer (B) is not considered, and substantially it is preferable to adopt values obtained by subtracting the amount of the repeating unit that is derived from the monomer (B) and actually contained from these upper limit value and lower limit value as the upper limit value and the lower limit value, respectively. From this point of view, the substantially preferred amount of the repeating unit derived from methyl methacrylate is 19.95% by mass or more and 58.6% by mass or less.

Such a resin molded article can be produced, for example, by using a resin composition satisfying the requirements described in claim 17.

The resin molded article of the invention can be formed as a resin molded article (F1) which exhibits noninflammability in the test by JIS K 6911 method A and satisfies the heat deflection temperature (HDT) of 90° C. or higher. In other words, the resin molded article (F1) is a resin molded article which achieves both heat resistance and flame retardancy that are contradictory properties and exhibits particularly remarkable heat resistance having a heat deflection temperature (HDT) of 90° C. or higher. Such a resin molded article (F1) can be produced by using a (meth)acrylic resin composition for obtaining the resin molded article (S1) described above.

In addition, the resin molded article of the invention can be formed as a resin molded article (F2) which satisfies the flame retardancy of the V-0 class in the vertical burning test specified in UL 94, the heat deflection temperature (HDT) of 60° C. or higher, and the total light transmittance of 89% or more. In other words, the resin molded article (F2) is a resin molded article which achieves both flame retardancy and heat resistance that are contradictory properties and exhibits particularly remarkable flame retardancy of the UL 94/V-0 class. Such a resin molded article (F2) can be produced by using a (meth)acrylic resin composition for obtaining the resin molded article (S2) described above.

In a case in which the resin molded article (F2) is required to exhibit higher heat resistance, it is possible to have a heat deflection temperature (HDT) of 70° C. or higher by increasing the content of the (meth)acrylic acid ester (M) in the (meth)acrylic polymer (P). This is attained, for example, by setting the content of the phosphorus atom-containing compound (C) with respect to 100 parts by mass of the (meth)acrylic polymer (P) to 22 parts by mass or less. In addition, in a case in which the resin molded article (F2) is required to exhibit higher transparency, it is possible to have a total light transmittance of 91% or more by decreasing the content of the phosphorus atom-containing compound (C). This is attained, for example, by setting the content of the phosphorus atom-containing compound (C) with respect to 100 parts by mass of the (meth)acrylic polymer (P) to 14.3 parts by mass or more and 33 parts by mass or less.

Furthermore, the resin molded article of the invention can be formed as a resin molded article (F3) which satisfies the flame retardancy of the V-0 class in the vertical burning test specified in UL 94, the heat deflection temperature (HDT) of 90° C. or higher, and the total light transmittance of 89% or more. In other words, the resin molded article (F3) is a resin molded article which achieves both flame retardancy and heat resistance that are contradictory properties and exhibits particularly remarkable flame retardancy of the UL 94/V-0 class and remarkable heat resistance having a heat deflection temperature (HDT) of 90° C. or higher. Such a resin molded article (F3) can be produced by using a (meth)acrylic resin composition for obtaining the resin molded article (S3) described above.

In a case in which the resin molded article (F3) is required to exhibit higher transparency, it is possible to have a total light transmittance of 92% or more by decreasing the content of the phosphorus atom-containing compound (C). This is attained, for example, by setting the content of the phosphorus atom-containing compound (C) to 11.1 parts by mass or more and 16.3 parts by mass or less.

Examples of the shape of the resin molded articles F0 to F3 may include a plate shaped molded article (resin plate). The thickness of the resin plate can be set, for example, to 1 mm or more and 30 mm or less.

EXAMPLES

Hereinafter, the invention will be described with reference to Examples. In the following description, the terms "parts" and "%" represent "parts by mass" and "% by mass", respectively.

In addition, the abbreviations of the compounds used in Examples and Comparative Examples are as follows.
MMA: methyl methacrylate
IBXMA: isobornyl methacrylate
IBXA: isobornyl acrylate
TBMA: t-butyl methacrylate
BA: n-butyl acrylate
CHMA: cyclohexyl methacrylate
CHA: cyclohexyl acrylate
EDMA: ethylene glycol dimethacrylate
NPGDMA: neopentyl glycol dimethacrylate
CR-570: chlorine-containing condensed phosphoric acid ester (trade name, manufactured by DAIHACHI CHEMICAL INDUSTRY CO., LTD.)

<Evaluation Methods>
The evaluation in Examples and Comparative Examples was carried out by the following methods.

(1) Flame Retardancy (JIS)

A specimen of a resin molded article was fabricated in conformity with the flame resistance test method A of JIS K 6911-1979 and the time (time to self-extinguishment) required until the specimen self-extinguished was measured.

⊙: Time to self-extinguishment of specimen is shorter than 1 minute.

◯: Time to self-extinguishment of specimen is 1 minute or longer and shorter than 3 minutes.

x: Time to self-extinguishment of specimen is 3 minutes or longer.

xx: Specimen does not self-extinguish.

(2) Flame Retardancy (UL 94)

The flame retardancy of a specimen (127 mm in length× 12.7 mm in width) of a resin molded article was evaluated in conformity with the UL 94 vertical burning test method. Flame retardancy is judged based on the criteria to be described in the following Table 1.

TABLE 1

|  | V-0 | V-1 | V-2 | Rejection |
| --- | --- | --- | --- | --- |
| Burning time after first or second contact of each specimen with flame | 10 seconds or shorter | 30 seconds or shorter | 30 seconds or shorter | Any of conditions V-0 to V-2 is not satisfied |
| Total (two times of contact with flame) burning time of five specimens | 50 seconds or shorter | 250 seconds or shorter | 250 seconds or shorter |  |
| Burning time after second contact of each specimen with flame + kindling time | 30 seconds or shorter | 60 seconds or shorter | 60 seconds or shorter |  |
| Burning of up to clamp | Absence | Absence | Absence |  |
| Line ignition by dripped material | Absence | Absence | Presence |  |

(3) Heat Resistance

A specimen (127 mm in length×12.7 mm in width) of a resin molded article was fabricated in conformity with JIS K 7191, and the heat deflection temperature (hereinafter, referred to as "HDT") (° C.) of the specimen was measured to evaluate the heat resistance.

(4) Transparency

In conformity with JIS K 7375, the total light transmittance (%) of a specimen (65 mm in length×45 mm in width) of a resin molded article was measured to evaluate the transparency.

(5) Weather Resistance

In conformity with JIS K 7350-4, the resin molded article was subjected to an exposure test for 1000 hours by a sunshine weather meter (condition: 63° C., 50%, water spray time of 12 minutes/60 minutes), and the yellow index (ΔYI) before and after the test was measured.

(6) Method of Measuring Polymer Amount in Polymerizable Monomer Composition

The amount of polymer in a polymerizable monomer composition was calculated by the methanol reprecipitation method. Into a 1 L glass beaker, 5 g of a polymerizable monomer composition and 5 g of acetone were added to dissolve the polymerizable monomer composition in acetone. Subsequently, 800 g of methanol was added thereto to precipitate the polymer in the polymerizable composition, and then the mixture was filtered through a glass filter to separate and recover the polymer. The polymer thus recovered was dried by being stored in a vacuum dryer at 60° C. for 3 days, the weight thereof after drying was measured, and the amount of the polymer in the polymerizable monomer composition and the amount of the monomer composition were calculated from the weights of the polymerizable monomer composition and the polymer.

(7) Glass Transition Temperature

The glass transition temperatures of homopolymers of the methacrylic acid ester (M1) and the acrylic acid ester (M2) were measured in conformity with JIS K 7121.

Hereinafter, examples of the (meth)acrylic resin composition of the resin molded article (S1) and the resin molded article will be disclosed in Examples 1 to 13.

Example 1

(1) Production of Syrup

A mixture of 68 parts of MMA, 20 parts of IBXMA, 3 parts of IBXA, 8 parts by mass of TBMA, and 1 part by mass of BA was supplied to a reactor (polymerization kettle) equipped with a cooling tube, a thermometer, and a stirrer, nitrogen gas was allowed to bubble in this mixture being stirred, and heating of the mixture was then started. At a time point at which the internal temperature reached 60° C., 0.1 part of 2,2'-azobis-(2,4-dimethylvaleronitrile) of a radical polymerization initiator was added thereto, the mixture was further heated until the internal temperature reached 100° C., the state was then retained for 13 minutes. Subsequently, the reactor was cooled to room temperature, thereby obtaining a polymerizable monomer composition (A1'). The content of the polymer (A1") in this polymerizable monomer composition (A1') was 30% and the content of the monomer composition (a1') therein was 70%.

(2) Cast Polymerization

To 100 parts by mass of the polymerizable monomer composition (A1') described above, 0.15 parts by mass of EDMA as the monomer (B), and 7.5 parts of the CR-570 (trade name, manufactured by DAIHACHI CHEMICAL INDUSTRY CO., LTD.) as the phosphorus atom-containing compound (c) were added, and 0.30 part by mass of t-hexyl peroxypivalate and 0.050 part by mass of sodium dioctyl sulfosuccinate were further added thereto, thereby obtaining a polymerizable composition (X2). Subsequently, the polymerizable composition (X2) was poured into a mold that was obtained by disposing a vinyl chloride resin gasket at the end portion of a SUS plate between two SUS plates facing each other and had an interval of the voids of 4.1 mm and heated at 82° C. for 30 minutes and then at 130° C. for 30 minutes to be polymerized, and the polymerized product was then cooled, thereby obtaining a laminate of (meth) acrylic resin composition. Furthermore, the SUS plate was removed to obtain a plate-shaped resin molded article having a thickness of 3 mm.

From the resin molded article thus obtained, a specimen for flame retardancy evaluation and a specimen for heat resistance evaluation were cut out by using a cutting machine, and the cut surface of the specimens was then polished by using a milling machine. The evaluation results of the resin molded article are presented in Table 2. The flame retardancy of the resin molded article thus obtained exhibited flame retardancy by the flame resistance test method A (hereinafter abbreviated as the "flame retardancy (JIS)") of JIS K 6911-1979, and the resin molded article exhibited heat resistance having a HDT of 97° C. and favorable weather resistance having a ΔYI of 5. The evaluation results of the resin molded article are presented in Table 2.

Examples 2 to 16

Resin molded articles were obtained in the same manner as in Example 1 except that the composition of the polymerizable composition (X2) was as presented in Table 2 and Table 3. The evaluation results of the resin molded articles are presented in Table 2 and Table 3.

TABLE 2

| | | | | Unit | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|---|---|
| Polymerizable composition (X2) | Polymerizable monomer composition (A1'') | Polymer (A1'') | MMA | Parts | 20.4 | 20.4 | 20.4 | 20.4 | 20.4 | 23.1 | 16.5 | 10.5 | 7.5 | 20.4 | 25.5 | 16.5 | 16.5 |
| | | | Methacrylic acid ester (M1) IBXMA | Parts | 6.0 | 6.0 | 6.0 | 6.0 | 6.0 | 6.0 | 12 | 18 | 21 | 6.0 | 3.0 | 12 | 12.0 |
| | | | Methacrylic acid ester (M1) CHMA | Parts | — | — | — | — | — | — | — | — | — | — | — | — | — |
| | | | Acrylic acid ester (M2) IBXA | Parts | 0.9 | 0.9 | 0.9 | 0.9 | 0.9 | 0.3 | 0.6 | 0.6 | 0.6 | 6.0 | 1.5 | 0.6 | 0.6 |
| | | | Acrylic acid ester (M2) CHA | Parts | — | — | — | — | — | — | — | — | — | 0.9 | — | — | — |
| | | | Copolymerizable monomer TBMA | Parts | 2.4 | 2.4 | 2.4 | 2.4 | 2.4 | 0.3 | 0.6 | 0.6 | 0.6 | 2.4 | — | 0.6 | 0.6 |
| | | | Copolymerizable monomer BA | Parts | 0.3 | 0.3 | 0.3 | 0.3 | 0.3 | 0.3 | 0.3 | 0.3 | 0.3 | 0.3 | — | 0.3 | 0.3 |
| | | Monomer composition (a1') | MMA | Parts | 47.6 | 47.6 | 47.6 | 47.6 | 47.6 | 53.9 | 38.5 | 24.5 | 17.5 | 47.6 | 59.5 | 38.5 | 38.5 |
| | | | Methacrylic acid ester (M1) IBXA | Parts | 14 | 14 | 14 | 14 | 14 | 14 | 28 | 42 | 49 | — | 7.0 | 28 | 28.0 |
| | | | Methacrylic acid ester (M1) CHMA | Parts | — | — | — | — | — | — | — | — | — | — | — | — | — |
| | | | Acrylic acid ester (M2) IBXA | Parts | 2.1 | 2.1 | 2.1 | 2.1 | 2.1 | 0.70 | 1.4 | 1.4 | 1.4 | 1.4 | 3.5 | 1.4 | 1.4 |
| | | | Acrylic acid ester (M2) CHA | Parts | — | — | — | — | — | — | — | — | — | 2.1 | — | — | — |
| | | | Copolymerizable monomer TBMA | Parts | 5.6 | 5.6 | 5.6 | 5.6 | 5.6 | 0.70 | 1.4 | 1.4 | 1.4 | 5.5 | — | 1.4 | 1.4 |
| | | | Copolymerizable monomer BA | Parts | 0.70 | 0.70 | 0.70 | 0.70 | 0.70 | 0.70 | 0.70 | 0.70 | 0.70 | 0.70 | — | 0.70 | 0.7 |
| | Monomer (B) | | EDMA | Parts | 0.15 | 0.15 | 0.11 | 0.36 | 0.11 | 0.15 | 0.15 | 0.15 | 0.15 | 0.15 | 0.15 | 0.15 | 0.15 |
| | | | NPGDMA | Parts | — | — | — | — | — | — | — | — | — | — | — | — | — |
| | Phosphorus atom-containing compound (C) | | CR570 | Parts | 7.5 | 10.5 | 7.5 | 7.5 | 7.5 | 10.5 | 10.5 | 10.5 | 10.5 | 7.5 | 7.5 | 10.5 | 10.5 |
| composition resin polymer (P) | (Meth)acrylic acid ester (M) | | MMA | % | 67.9% | 67.9% | 68.0% | 67.8% | 68.0% | 76.9% | 55.0% | 35.0% | 25.0% | 67.9% | 84.9% | 55.0% | 55.0% |
| | | | Methacrylic acid ester (M1) IBXA | % | 20.0% | 20.0% | 20.0% | 20.0% | 20.0% | 20.0% | 40.0% | 60.0% | 69.9% | — | 10.0% | 40.0% | 40.0% |
| | | | Methacrylic acid ester (M1) CHMA | % | — | — | — | — | — | — | — | — | — | 20.0% | — | — | — |
| | | | Acrylic acid ester (M2) IBXA | % | 3.00% | 3.00% | 3.00% | 3.00% | 3.00% | 1.00% | 2.00% | 2.00% | 2.00% | 3.00% | 4.95% | 2.00% | 2.00% |
| | | | Acrylic acid ester (M2) CHA | % | — | — | — | — | — | — | — | — | — | — | — | — | — |
| | Copolymerizable monomer | | TBMA | % | 7.95% | 7.95% | 7.89% | 7.84% | 7.89% | 0.95% | 1.85% | 1.85% | 1.95% | 7.95% | — | 1.85% | 1.85% |
| | | | BA | % | 1.00% | 1.00% | 1.00% | 1.00% | 1.00% | 1.00% | 1.00% | 1.00% | 1.00% | 1.00% | — | 1.00% | 1.00% |
| | Monomer (B) | | EDMA | % | 0.15% | 0.15% | 0.11% | 0.36% | — | 0.15% | 0.15% | 0.15% | 0.15% | 0.15% | 0.15% | 0.15% | 0.15% |
| | | | NPGDMA | % | — | — | — | — | 0.11% | — | — | — | — | — | — | — | — |
| | Phosphorus atom-containing compound (C) (*amount with respect to 100 parts by mass of (meth)acrylic polymer (P)) | | CR570 | Parts | 7.5 | 10.5 | 7.5 | 7.5 | 7.5 | 10.5 | 10.5 | 10.5 | 10.5 | 7.5 | 7.5 | 10.5 | 10.5 |
| Evaluation results | Thickness of plate | | | mm | 3.0 | 3.0 | 3.0 | 3.0 | 3.0 | 3.0 | 3.0 | 3.0 | 3.0 | 3.0 | 3.0 | 1.0 | 30.0 |
| | Flame retardancy (JIS) | | | (—) | ○ | ○ | ○ | ○ | ○ | ○ | ○ | ○ | ○ | ○ | ○ | ⊙ | ⊙ |
| | Flame retardancy (UL 94) | | | (—) | — | — | — | — | — | — | — | — | — | — | — | — | — |
| | Transparency (total light transmittance) | | | % | 92 | 92 | 92 | 92 | 92 | 92 | 92 | 92 | 92 | 92 | 92 | 92 | 92 |
| | Heat resistance (heat deflection temperature: HDT) | | | °C | 97 | 92 | 97 | 97 | 97 | 94 | 96 | 97 | 98 | 92 | 91 | 96 | 96 |
| | Weather resistance test (AYI) | | | (—) | 5 | 5 | 5 | 5 | 5 | 5 | 5 | 5 | 5 | 5 | 3 | 5 | 5 |

Example 17

A resin molded article was obtained in the same manner as in Example 1 except that the monomer (D) (IBXA) among the (meth)acrylic acid esters (M) was not used but the amount of IBXMA was increased (to 32 parts by mass as a total content) instead in the composition of the polymerizable monomer composition of Example 14. The resin molded article thus obtained exhibited favorable flame retardancy (JIS) and favorable heat resistance having a HDT of 90° C. or higher. The resin molded article did not contain the monomer (D) and thus exhibited slightly inferior weather resistance (ΔYI).

Examples 18 and 19

Resin molded articles were obtained in the same manner as in Example 1 except that the composition of the polymerizable composition (X2) was changed to those presented in Table 3. The evaluation results of the resin molded articles are presented in Table 3. The resin molded articles thus obtained exhibited favorable flame retardancy (JIS), heat resistance having a HDT of 90° C. or higher, and also favorable weather resistance (ΔYI).

Example 20

A resin molded article was obtained in the same manner as in Example 1 except that the composition of the polymerizable composition (X2) was changed to that presented in Table 3. The evaluation results of the resin molded article are presented in Table 3.

Example 21

Syrup was obtained in the same manner as in Example 1 except that 60.0 parts of MMA, 37.0 parts of IBXMA, 2.0 parts of IBXA, 0.4 part of TBMA, and 0.6 part of BA were used as the monomer composition (a1"). At this time, the content of the (meth)acrylic acid ester (M) in the monomer composition (a1") was 40% by mass. The syrup thus obtained was a polymerizable monomer composition (A1') having 30% of a polymer (A1') and 70% of a monomer composition (a1') containing MMA at 60.0 parts, IBXMA at 37.0 parts, IBXA at 2.0 parts, TBMA at 0.4 part, and BA at 0.6 part. At this time, the content of the (meth)acrylic acid ester (M) in the polymerizable monomer composition (A1') was 40% by mass. A resin molded article was obtained in the same manner as in Example 1 except that this polymerizable monomer composition (A1') was used. The evaluation results of the resin molded article are presented in Table 3. The resin molded articles thus obtained exhibited favorable flame retardancy (JIS), heat resistance having a HDT of 90° C. or higher, and also favorable weather resistance (ΔYI) since the (meth)acrylic acid ester (M) was less than 41% by mass in the resin molded article thus obtained.

Example 22

A resin molded article was obtained in the same manner as in Example 1 except that the composition of the polymerizable composition (X2) was changed to that presented in Table 3. The evaluation results of the resin molded article are presented in Table 3. The resin molded articles thus obtained exhibited favorable flame retardancy (JIS), heat resistance having a HDT of 90° C. or higher, and also favorable weather resistance (ΔYI).

Example 23

A resin molded article was obtained in the same manner as in Example 1 except that the composition of the polymerizable composition (X2) was changed to that presented in Table 3. The evaluation results of the resin molded article are presented in Table 3. The resin molded articles thus obtained exhibited favorable flame retardancy (JIS), heat resistance having a HDT of 90° C. or higher, and also favorable weather resistance (ΔYI).

Example 24

A resin molded article was obtained in the same manner as in Example 1 except that the composition of the polymerizable composition (X2) was changed to that presented in Table 3. The evaluation results of the resin molded article are presented in Table 3. The resin molded articles thus obtained exhibited favorable flame retardancy (JIS), heat resistance having a HDT of 90° C. or higher, and also favorable weather resistance (ΔYI).

Example 25

Syrup was obtained in the same manner as in Example 1 except that the composition of the polymerizable composition (X2) was changed to that presented in Table 3. At this time, the content of the (meth)acrylic acid ester (M) in the monomer composition (a1") was 40% by mass. The syrup thus obtained was a polymerizable monomer composition (A1') having 30% of a polymer (A1') and 70% of a monomer composition (a1') containing MMA at 60.0 parts, IBXMA at 37.0 parts, TBMA at 2.4 part, and BA at 0.6 part. At this time, the content of the (meth)acrylic acid ester (M) in the polymerizable monomer composition (A1') was 40% by mass. A resin molded article was obtained in the same manner as in Example 6 except that this polymerizable monomer composition (A1') was used. The evaluation results of the resin molded article are presented in Table 3. The resin molded articles thus obtained exhibited favorable flame retardancy (JIS) and favorable heat resistance having a HDT of 90° C. or higher but poor weather resistance (ΔYI) since IBXA was not used but the amount of TBMA was increased to 2.4 parts instead in the resin molded article.

TABLE 3

| | | | | | Unit | Example 14 | Example 15 | Example 16 | Example 17 | Example 18 | Example 19 | Example 20 | Example 21 | Example 22 | Example 23 | Example 24 | Example 25 |
|---|---|---|---|---|---|---|---|---|---|---|---|---|---|---|---|---|---|
| Polymerizable composition (X2) | Polymerizable monomer composition (A1') | Polymer (A1") | | MMA | Parts | 20.4 | 20.4 | 21.0 | 20.4 | 20.4 | 12.0 | 6.0 | 18.0 | 17.4 | 12.0 | 6.0 | 12.0 |
| | | | (Meth) acrylic acid ester (M) | Methacrylic acid ester (M1) IBXMA | Parts | 8.4 | 9.45 | 4.5 | 9.6 | 6.0 | 17 | 23 | 11.1 | 11.7 | 17.1 | 23.1 | 17.1 |
| | | | | CHMA | Parts | | | | | | | | | | | | |
| | | | | Acrylic acid ester (M2) IBXA | Parts | 1.2 | 0.15 | 4.5 | | 0.9 | 1.0 | 1.0 | 0.6 | 0.6 | 0.6 | 0.6 | |
| | | | | CHA | Parts | | | | | | | | | | | | 0.7 |
| | | | | TBMA | Parts | | | | | | | | | | | | |
| | | | Copolymerizable monomer | BA | Parts | | | | | | | | | | | | 0.2 |
| | | Monomer composition (a1') | (Meth) acrylic acid ester (M) | Methacrylic acid ester (M1) IBXMA | Parts | 47.6 | 47.6 | 49 | 47.6 | 47.6 | 28 | 14 | 42.0 | 40.6 | 28.0 | 14.0 | 28.0 |
| | | | | CHMA | Parts | 19.6 | 22.1 | 10.5 | 22.4 | 14.0 | 41.0 | 55.0 | 25.9 | 27.3 | 39.9 | 53.9 | 39.9 |
| | | | | Acrylic acid ester (M2) IBXA | Parts | 2.8 | 0.35 | 10.5 | | 2.1 | 1.0 | 1.0 | 1.4 | 1.4 | 1.4 | 1.4 | |
| | | | | CHA | Parts | | | | | | | | | | | | 1.7 |
| | | | | TBMA | Parts | | | | | 5.6 | | | 0.28 | 0.28 | 0.28 | 0.28 | 0.4 |
| | | | Copolymerizable monomer | BA | Parts | | | | | 0.70 | | | 0.42 | 0.42 | 0.42 | 0.42 | |
| | | | | EDMA | Parts | 0.15 | 0.15 | 0.15 | 0.15 | 0.12 | 0.12 | 0.12 | 0.12 | 0.12 | 0.12 | 0.12 | 0.12 |
| | | | | NPGDMA | Parts | | | | | | | | | | | | |
| | | Phosphorus atom-containing compound (C) | | CR570 | Parts | 7.5 | 10.5 | 7.5 | 7.5 | 10 | 10 | 8.0 | 13.6 | 12.4 | 11.5 | 10.5 | 12.4 |
| | Polymerizable resin composition (P) | (Meth) acrylic polymer | (Meth) acrylic acid ester (M) | Methacrylic acid ester (M1) IBXA | % | 67.9% | 67.9% | 69.9% | 67.9% | 68.0% | 40.0% | 20.0% | 59.9% | 57.9% | 39.9% | 19.9% | 39.9% |
| | | | | CHMA | % | 28.0% | 31.5% | 15.0% | 31.95% | 20.0% | 58.0% | 78.0% | 37.0% | 39.0% | 57.0% | 77.0% | 57.0% |
| | | | | Acrylic acid ester (M2) IBXA | % | 3.95% | 0.45% | 14.95% | | 3.00% | 1.88% | 1.88% | 2.00% | 2.00% | 2.00% | 2.00% | |
| | | | | CHA | % | | | | | | | | | | | | 2.33% |
| | | | | TBMA | % | | | | | 7.88% | | | 0.38% | 0.38% | 0.38% | 0.38% | 0.60% |
| | | | Copolymerizable monomer | BA | % | | | | | 1.00% | | | 0.60% | 0.60% | 0.60% | 0.60% | |
| | | | Monomer (B) | EDMA | % | 0.15% | 0.15% | 0.15% | 0.15% | 0.12% | 0.12% | 0.12% | 0.12% | 0.12% | 0.12% | 0.12% | 0.12% |
| | | | | NPGDMA | | | | | | | | | | | | | |
| | Phosphorus atom-containing compound (C) (*amount with respect to 100 parts by mass of (meth)acrylic polymer (P)) | | | CR570 | Parts | 17.5 | 10.5 | 7.5 | 7.5 | 10 | 10 | 8 | 13.6 | 12.4 | 11.5 | 10.5 | 12.4 |
| Evaluation results | | | | Thickness of plate | mm | 3.0 | 3.0 | 3.0 | 3.0 | 3.0 | 3.0 | 3.0 | 3.0 | 3.0 | 1.0 | 3.0 | 3.0 |
| | | | | Flame retardancy (JIS) | (—) | ⊚ | ⊚ | ⊚ | ⊚ | ⊚ | ⊚ | ⊚ | ⊚ | ⊚ | ⊚ | ⊚ | ⊚ |
| | | | | Flame retardancy (UL 94) | (—) | | | | | | | | | | | | |
| | | | | Transparency (total light transmittance) | % | 92 | 92 | 92 | 92 | 92 | 92 | 92 | 92 | 92 | 92 | 92 | 92 |
| | | | | Heat resistance (heat deflection temperature: HDT) | (°C.) | 98 | 99 | 90 | 90 | 92 | 98 | 100 | 90 | 93 | 95 | 101 | 95 |
| | | | | Weather resistance test (ΔYI) | (—) | 5 | 7 | 3 | 10 | 5 | 5 | 5 | 5 | 5 | 5 | 5 | 10 |

Examples 26 to 29 are vacant numbers.

Hereinafter, examples of the (meth)acrylic resin composition of the resin molded article (S2) and the resin molded article will be disclosed in Examples 30 to 55.

Example 30

A resin molded article was obtained in the same manner as in Example 1 except that the polymerizable monomer composition of Example 1 was used and the amount of the phosphorus atom-containing compound (C) added was changed to 14 parts by mass. The evaluation results of the resin molded article are presented in Table 4. The resin molded article thus obtained exhibited favorable flame retardancy (JIS), granted with V-0 of acceptance in the UL 94 V test (abbreviated as the "flame retardancy (UL 94)"), and exhibited heat resistance having a HDT of 88° C. and also favorable weather resistance ($\Delta YI$) and transparency since the resin molded article contained the phosphorus atom-containing compound (C) in a great amount of 14 parts by mass.

Example 31

A resin molded article was obtained in the same manner as in Example 7 except that the polymerizable monomer composition of Example 7 was used and the amount of the phosphorus atom-containing compound (C) added was changed to 16 parts by mass. The evaluation results of the resin molded article are presented in Table 4. The resin molded article thus obtained exhibited favorable flame retardancy (JIS), flame retardancy (UL 94) of V-0 of acceptance, heat resistance having a HDT of 60° C. or higher, and also favorable weather resistance ($\Delta YI$) and transparency.

Example 32

A resin molded article was obtained in the same manner as in Example 9 except that the polymerizable monomer composition of Example 9 was used and the amount of the phosphorus atom-containing compound (C) added was changed to 18 parts by mass. The evaluation results of the resin molded article are presented in Table 4. The resin molded article thus obtained exhibited favorable flame retardancy (JIS), flame retardancy (UL 94) of V-0 of acceptance, heat resistance having a HDT of 60° C. or higher, and also favorable weather resistance ($\Delta YI$) and transparency t.

Example 33

(1) Production of Syrup

A monomer composition (a1") composed of 68 parts of MMA, 20 parts of IBXMA, 3 parts of IBXA, 8 parts of TBMA, and 1 part of BA was charged into a reactor (polymerization kettle) equipped with a cooling tube, a thermometer, and a stirrer. Nitrogen gas was allowed to bubble in this monomer composition (a1") being stirred, and heating of the monomer composition (a1") was then started. At a time point at which the temperature of the monomer composition (a1") reached 60° C., 0.1 part of 2,2'-azobis-(2,4-dimethylvaleronitrile) of a radical polymerization initiator was added thereto, the monomer composition (a1") was further heated until the temperature thereof reached 100° C., the state was then retained for 13 minutes. Thereafter, the reactor was cooled to room temperature, thereby obtaining syrup. The syrup thus obtained was a polymerizable monomer composition (A1') having 30% of a polymer (A1') and 70% of the monomer composition (a1") containing MMA at 68 parts, IBXMA at 20 parts, IBXA at 3 parts, TBMA at 8 parts, and BA at 1 part.

(2) Cast Polymerization

To 100 parts of the polymerizable monomer composition (A1') described above, 0.12 part of EDMA as the monomer (B), and 16 parts of the CR-570 as the phosphoric acid ester (c) were added, and 0.30 part of t-hexyl peroxypivalate and 0.050 part of sodium dioctyl sulfosuccinate were further added thereto, thereby obtaining a polymerizable composition (X2). Two SUS plates were allowed to face each other and a vinyl chloride resin gasket was disposed at the end portion of a SUS plate between the two SUS plates, thereby fabricating a mold having an interval of the voids of 4.1 mm.

The polymerizable composition (X2) was poured into the mold described above and heated at 82° C. for 30 minutes and then at 130° C. for 30 minutes to be polymerized, and the polymerized product was then cooled. Thereafter, the SUS plate was removed to obtain a plate-shaped resin molded article having a thickness of 3 mm. From the resin molded article thus obtained, a specimen for flame retardancy evaluation, a specimen for heat resistance evaluation, and a specimen for transparency evaluation were cut out by using a cutting machine. The end face of the specimens thus cut was trimmed down by using a milling machine. The resin molded article thus obtained exhibited flame retardancy (UL 94) of V-0 to be acceptable, heat resistance having a HDT of 74° C., and favorable transparency having a total light transmittance of 92%. The evaluation results of the resin molded article are presented in Table 4.

Examples 34 to 37

Resin molded articles were obtained in the same manner as in Example 33 except that the composition of the polymerizable composition (X2) was changed to those presented in Table 4. The evaluation results of the resin molded articles are presented in Table 4.

Examples 38 to 45

Resin molded articles were obtained in the same manner as in Example 33 except that the composition of the polymerizable composition (X2) was changed to those presented in Table 4 and Table 5. The evaluation results of the resin molded articles are presented in Table 4 and Table 5.

TABLE 4

| | | | | | Unit | Example 30 | Example 31 | Example 32 | Example 33 | Example 34 | Example 35 | Example 36 | Example 37 | Example 38 | Example 39 | Example 40 |
|---|---|---|---|---|---|---|---|---|---|---|---|---|---|---|---|---|
| Polymerizable monomer composition (X2) | Polymer (A1'') | | MMA | | Parts | 20.4 | 16.5 | 7.5 | 20.4 | 20.4 | 20.4 | 20.4 | 20.4 | 20.4 | 20.4 | 20.4 |
| | | (Meth)acrylic acid ester (M) | Methacrylic acid ester (M1) | IBXMA | Parts | 6.0 | — | — | 6.0 | 6.0 | 6.0 | 6.0 | 6.0 | 6.0 | 6.0 | 6.0 |
| | | | | CHMA | Parts | — | 12 | 21 | — | — | — | — | — | — | — | — |
| | | | Acrylic acid ester (M2) | IBXA | Parts | 0.9 | 0.6 | 0.6 | 0.9 | 0.9 | 0.9 | 0.9 | 0.9 | 0.9 | 0.9 | 0.9 |
| | | | | CHA | Parts | — | — | — | — | — | — | — | — | — | — | — |
| | | Copolymerizable monomer | | TBMA | Parts | 2.4 | 0.6 | 0.6 | 2.4 | 2.4 | 2.4 | 2.4 | 2.4 | 2.4 | 2.4 | 2.4 |
| | | | | BA | Parts | 0.3 | 0.3 | 0.3 | 0.3 | 0.3 | 0.3 | 0.3 | 0.3 | 0.3 | 0.3 | 0.3 |
| | Monomer composition (a1') | (Meth)acrylic acid ester (M) | Methacrylic acid ester (M1) | IBXA | Parts | 47.6 | 38.5 | 17.5 | 47.6 | 47.6 | 47.6 | 47.6 | 47.6 | 47.6 | 47.6 | 47.6 |
| | | | | CHMA | Parts | 14 | 28 | 49 | 14 | 14 | 14 | 14 | 14 | 14 | 14 | 14 |
| | | | Acrylic acid ester (M2) | IBXA | Parts | 2.1 | 1.4 | 1.4 | 2.1 | 2.1 | 2.1 | 2.1 | 2.1 | 2.1 | 2.1 | 2.1 |
| | | | | CHA | Parts | — | — | — | — | — | — | — | — | — | — | — |
| | | Copolymerizable monomer | | TBMA | Parts | 5.6 | 1.4 | 1.4 | 5.6 | 5.6 | 5.6 | 5.6 | 5.6 | 5.6 | 5.6 | 5.6 |
| | | | | BA | Parts | 0.70 | 0.70 | 0.70 | 0.70 | 0.70 | 0.70 | 0.70 | 0.70 | 0.70 | 0.70 | 0.70 |
| | Monomer (B) | | EDMA | | Parts | 0.15 | 0.15 | 0.15 | 0.12 | 0.15 | 0.18 | 0.07 | 0.12 | 0.07 | 0.30 | 0.30 |
| | | | NPGDMA | | Parts | — | — | — | — | — | — | 0.05 | — | — | — | — |
| | Phosphorus atom-containing compound (C) | | CR570 | | Parts | 14 | 16 | 18 | 16 | 16 | 16 | 16 | 18 | 18 | 18 | 33 |
| Polymer composition (P) (Meth)acrylic resin (Meth)acrylic | (Meth)acrylic acid ester (M) | Methacrylic | MMA | | % | 67.9% | 54.9% | 25.0% | 68.0% | 67.9% | 67.9% | 68.0% | 68.0% | 68.0% | 67.8% | 67.8% |
| | | | acid ester (M1) | IBXA | % | 20.0% | 40.0% | 69.9% | 20.0% | 20.0% | 20.0% | 20.0% | 20.0% | 20.0% | 20.0% | 20.0% |
| | | | | CHMA | % | — | — | — | — | — | — | — | — | — | — | — |
| | | Acrylic | acid ester (M2) | IBXA | % | 3.00% | 2.00% | 2.00% | 3.00% | 3.00% | 3.00% | 3.00% | 3.00% | 3.00% | 3.00% | 3.00% |
| | | | | CHA | % | — | — | — | — | — | — | — | — | — | — | — |
| | Copolymerizable monomer | | TBMA | | % | 7.95% | 1.95% | 1.95% | 7.88% | 7.95% | 7.92% | 7.68% | 7.88% | 7.93% | 7.90% | 7.90% |
| | | | BA | | % | 1.00% | 1.00% | 1.00% | 1.00% | 1.00% | 1.00% | 1.00% | 1.00% | 1.00% | 1.00% | 1.00% |
| | Monomer (B) | | EDMA | | % | 0.15% | 0.15% | 0.15% | 0.12% | 0.15% | 0.18% | 0.07% | 0.12% | 0.07% | 0.30% | 0.30% |
| | | | NPGDMA | | % | — | — | — | — | — | — | 0.05% | — | — | — | — |
| | Phosphorus atom-containing compound (C) (*amount with respect to 100 parts by mass of (meth)acrylic polymer (P)) | | CR570 | | Parts | 14 | 16 | 18 | 16 | 16 | 16 | 16 | 18 | 18 | 18 | 33 |
| Evaluation results | Thickness of plate | | | | mm | 3.0 | 3.0 | 3.0 | 3.0 | 3.0 | 3.0 | 3.0 | 3.0 | 3.0 | 3.0 | 3.0 |
| | Flame retardancy (JIS) | | | | (—) | ⊙ | ⊙ | ⊙ | ⊙ | ⊙ | ⊙ | ⊙ | ⊙ | ⊙ | ⊙ | ⊙ |
| | Flame retardancy (UL 94) | | | | (—) | V-0 | V-0 | V-0 | V-0 | V-0 | V-0 | V-0 | V-0 | V-0 | V-0 | V-0 |
| | Transparency (total light transmittance) | | | | % | 92 | 92 | 92 | 92 | 92 | 92 | 92 | 92 | 92 | 92 | 92 |
| | Heat resistance (heat deflection temperature: HDT) | | | | (°C.) | 88 | 85 | 84 | 74 | 74 | 74 | 74 | 70 | 70 | 70 | 62 |
| | Weather resistance test (ΔYI) | | | | (—) | 5 | 6 | 6 | 4 | 4 | 4 | 4 | 4 | 4 | 4 | 4 |

Examples 46 to 51

Resin molded articles were obtained in the same manner as in Example 33 except that the composition of the polymerizable composition (X2) was changed to those presented in Table 5. The evaluation results of the resin molded articles are presented in Table 5.

Example 52

A resin molded article was obtained in the same manner as in Example 33 except that the composition of the polymerizable composition (X2) was changed to that presented in Table 5. The evaluation results of the resin molded article are presented in Table 5.

Example 53

A resin molded article was obtained in the same manner as in Example 33 except that the amount of the phosphorus atom-containing compound (C) added was changed to 14.3 parts. The evaluation results of the resin molded article are presented in Table 5. The resin molded article thus obtained exhibited favorable flame retardancy (JIS), flame retardancy (UL 94) of V-0 to be acceptable, heat resistance having a HDT of 60° C. or higher, and also favorable weather resistance ($\Delta$YI) and transparency.

Example 54

A resin molded article was obtained in the same manner as in Example 1 except that the composition of the polymerizable composition (X2) was changed to that presented in Table 5. The evaluation results of the resin molded article are presented in Table 5. The resin molded article thus obtained exhibited favorable flame retardancy (JIS), flame retardancy (UL 94) of V-0 to be acceptable, heat resistance having a HDT of 60° C. or higher, and also favorable weather resistance ($\Delta$YI) and transparency.

Example 55

A resin molded article was obtained in the same manner as in Example 1 except that the composition of the polymerizable composition (X2) was changed to that presented in Table 5. The evaluation results of the resin molded article are presented in Table 5. The resin molded article thus obtained exhibited favorable flame retardancy (JIS), flame retardancy (UL 94) of V-0 to be acceptable, heat resistance having a HDT of 60° C. or higher, and also favorable weather resistance ($\Delta$YI) and transparency.

TABLE 5

| | | | | | | Unit | Example 41 | Example 42 | Example 43 | Example 44 | Example 45 | Example 46 | Example 47 | Example 48 |
|---|---|---|---|---|---|---|---|---|---|---|---|---|---|---|
| Polymerizable composition (X2) | Polymerizable monomer composition (A1') | Polymer (A1") | (Meth)acrylic acid ester (M) | Methacrylic acid ester (M1) | MMA | Parts | 18 | 18 | 12 | 12 | 7.0 | 20.4 | 25.5 | 20.4 |
| | | | | | IBXMA | Parts | 11 | 11 | 17 | 17 | 21 | — | 3.0 | 6.0 |
| | | | | | CHMA | Parts | — | — | — | — | — | 6.0 | — | — |
| | | | | Acrylic acid ester (M2) | IBXA | Parts | 1.0 | 1.0 | 1.0 | 1.0 | 1.0 | — | 1.5 | 0.9 |
| | | | | | CHA | Parts | — | — | — | — | — | 0.9 | — | — |
| | | | Copolymerizable monomer | | TBMA | Parts | — | — | — | — | — | 2.4 | — | 2.4 |
| | | | | | BA | Parts | — | — | — | — | — | 0.3 | — | 0.3 |
| | | Monomer composition (a1') | (Meth)acrylic acid ester (M) | Methacrylic acid ester (M1) | MMA | Parts | 42 | 42 | 28 | 28 | 18 | 47.6 | 59.5 | 47.6 |
| | | | | | IBXA | Parts | 27 | 27 | 41 | 41 | 52 | — | 7.0 | 14 |
| | | | | | CHMA | Parts | — | — | — | — | — | 14 | — | — |
| | | | | Acrylic acid ester (M2) | IBXA | Parts | 1.0 | 1.0 | 1.0 | 1.0 | 1.0 | — | 3.5 | 2.1 |
| | | | | | CHA | Parts | — | — | — | — | — | 2.1 | — | — |
| | | | Copolymerizable monomer | | TBMA | Parts | — | — | — | — | — | 5.6 | — | 5.6 |
| | | | | | BA | Parts | — | — | — | — | — | 0.70 | — | 0.7 |
| | | Monomer (B) | | | EDMA | Parts | 0.12 | 0.12 | 0.12 | 0.12 | 0.12 | 0.12 | 0.12 | 0.12 |
| | | | | | NPGDMA | Parts | — | — | — | — | — | — | — | — |
| | Phosphorus atom-containing compound (C) | | | | CR570 | Parts | 16 | 33 | 16 | 33 | 20 | 16 | 16 | 33 |
| composition resin (Meth)acrylic | polymer (P) (Meth)acrylic | MMA | | | | % | 60.0% | 60.0% | 40.0% | 40.0% | 25.0% | 68.0% | 84.9% | 68.0% |
| | | (Meth)acrylic acid ester (M) | Methacrylic acid ester (M1) | IBXA | | % | 38.0% | 38.0% | 58.0% | 58.0% | 73.0% | — | 10.0% | 20.0% |
| | | | | CHMA | | % | — | — | — | — | — | 20.0% | — | — |
| | | | Acrylic acid ester (M2) | IBXA | | % | 1.88% | 1.88% | 1.88% | 1.88% | 1.88% | — | 4.98% | 3.00% |
| | | | | CHA | | % | — | — | — | — | — | 3.00% | — | — |
| | | Copolymerizable monomer | | TBMA | | % | — | — | — | — | — | 7.88% | — | 7.88% |
| | | | | BA | | % | — | — | — | — | — | 1.00% | — | 1.00% |
| | | Momomer (B) | | EDMA | | % | 0.12% | 0.12% | 0.12% | 0.12% | 0.12% | 0.12% | 0.12% | 0.12% |
| | | | | NPGDMA | | % | — | — | — | — | — | — | — | — |

TABLE 5-continued

|  |  |  |  |  |  |  |  |  |  |  |  |
|---|---|---|---|---|---|---|---|---|---|---|---|
|  | Phosphorus atom-containing compound (C) (*amount with respect to 100 parts by mass of (meth)acrylic polymer (P)) | CR570 | Parts | 16 | 33 | 16 | 33 | 20 | 16 | 16 | 33 |
| Evaluation results | Thickness of plate | | mm | 3.0 | 3.0 | 3.0 | 3.0 | 3.0 | 3.0 | 3.0 | 3.0 |
|  | Flame retardancy (JIS) | | (—) | ⊙ | ⊙ | ⊙ | ⊙ | ⊙ | ⊙ | ⊙ | ⊙ |
|  | Flame retardancy (UL 94) | | (—) | V-0 | V-0 | V-0 | V-0 | V-0 | V-0 | V-0 | V-0 |
|  | Transparency (total light transmittance) | | % | 92 | 92 | 92 | 92 | 92 | 92 | 92 | 92 |
|  | Heat resistance (heat deflection temperature: HDT) | | (° C.) | 86 | 64 | 87 | 86 | 80 | 72 | 70 | 60 |
|  | Weather resistance test (ΔYI) | | (—) | 5 | 5 | 5 | 5 | 5 | 4 | 3 | 4 |

|  |  |  |  |  |  | Example 49 | Example 50 | Example 51 | Example 52 | Example 53 | Example 54 | Example 55 |
|---|---|---|---|---|---|---|---|---|---|---|---|---|
| Polymerizable composition (X2) | Polymerizable monomer composition (A1′) | Polymer (A1″) | (Meth)acrylic acid ester (M) | Methacrylic acid ester (M1) | MMA | 7.0 | 7.0 | 7.0 | 20.4 | 17.4 | 12.0 | 6.0 |
|  |  |  |  |  | IBXMA | 21 | 21 | 21 | 6 | 11.7 | 17.1 | 23.1 |
|  |  |  |  |  | CHMA | — | — | — | — | — | — | — |
|  |  |  |  | Acrylic acid ester (M2) | IBXA | 1.0 | 1.0 | 1.0 | — | 0.6 | 0.6 | 0.6 |
|  |  |  |  |  | CHA | — | — | — | — | — | — | — |
|  |  |  | Copolymerizable monomer | | TBMA | — | — | — | 3.3 | 0.1 | 0.1 | 0.1 |
|  |  |  |  | | BA | — | — | — | 0.3 | 0.2 | 0.2 | 0.2 |
|  |  | Monomer composition (a1′) | (Meth)acrylic acid ester (M) | Methacrylic acid ester (M1) | MMA | 18 | 18 | 18 | 47.6 | 40.6 | 28.0 | 14.0 |
|  |  |  |  |  | IBXA | 52 | 52 | 52 | 14 | 27.3 | 39.9 | 53.9 |
|  |  |  |  |  | CHMA | — | — | — | — | — | — | — |
|  |  |  |  | Acrylic acid ester (M2) | IBXA | 1.0 | 1.0 | 1.0 | — | 1.4 | 1.4 | 1.4 |
|  |  |  |  |  | CHA | — | — | — | — | — | — | — |
|  |  |  | Copolymerizable monomer | | TBMA | — | — | — | 7.7 | 0.28 | 0.28 | 0.28 |
|  |  |  |  | | BA | — | — | — | 0.70 | 0.42 | 0.42 | 0.42 |
|  |  | Monomer (B) | | | EDMA | 0.12 | 0.12 | 0.12 | 0.12 | 0.12 | 0.12 | 0.12 |
|  |  |  | | | NPGDMA | — | — | — | — | — | — | — |
|  |  | Phosphorus atom-containing compound (C) | | | CR570 | 33 | 33 | 33 | 16 | 14.3 | 15.6 | 17.6 |
| composition resin (Meth)acrylic | polymer (P) | (Meth)acrylic acid ester (M) | Methacrylic acid ester (M1) | | MMA | 25.0% | 25.0% | 25.0% | 58.0% | 57.9% | 39.9% | 19.9% |
|  |  |  |  | | IBXA | 73.0% | 73.0% | 73.0% | 20.0% | 39.0% | 57.0% | 77.0% |
|  |  |  |  | | CHMA | — | — | — | — | — | — | — |
|  |  |  | Acrylic acid ester (M2) | | IBXA | 1.88% | 1.88% | 1.88% | 10.88% | 2.00% | 2.00% | 2.00% |
|  |  |  |  | | CHA | — | — | — | — | — | — | — |
|  |  | Copolymerizable monomer | | | TBMA | — | — | — | — | 0.38% | 0.38% | 0.38% |
|  |  |  | | | BA | — | — | — | 1.00% | 0.60% | 0.60% | 0.60% |
|  |  | Monomer (B) | | | EDMA | 0.12% | 0.12% | 0.12% | 0.12% | 0.12% | 0.12% | 0.12% |
|  |  |  | | | NPGDMA | — | — | — | — | — | — | — |
|  | Phosphorus atom-containing compound (C) (*amount with respect to 100 parts by mass of (meth)acrylic polymer (P)) | | | | CR570 | 33 | 33 | 33 | 16 | 14.3 | 15.6 | 17.6 |
| Evaluation results | Thickness of plate | | | | | 3.0 | 1.0 | 30.0 | 3.0 | 3.0 | 3.0 | 3.0 |
|  | Flame retardancy (JIS) | | | | | ⊙ | ⊙ | ⊙ | ⊙ | ⊙ | ⊙ | ⊙ |
|  | Flame retardancy (UL 94) | | | | | V-0 | V-0 | V-0 | V-0 | V-0 | V-0 | V-0 |
|  | Transparency (total light transmittance) | | | | | 92 | 92 | 92 | 92 | 92 | 92 | 92 |
|  | Heat resistance (heat deflection temperature: HDT) | | | | | 70 | 70 | 70 | 68 | 89 | 89 | 88 |
|  | Weather resistance test (ΔYI) | | | | | 5 | 5 | 5 | 10 | 5 | 5 | 5 |

Examples 56 to 59 are vacant numbers.

Hereinafter, examples of the (meth)acrylic resin composition of the resin molded article (S3) and the resin molded article will be disclosed in Examples 60 to 74.

Example 60

(1) Production of Syrup

A monomer composition (a1") composed of 58.0 parts of MMA, 39.0 parts of IBXMA, 2.0 parts of IBXA, 0.4 part of TBMA, and 0.6 part of BA was charged into a reactor (polymerization kettle) equipped with a cooling tube, a thermometer, and a stirrer. At this time, the content of the (meth)acrylic acid ester (M) in the monomer composition (a1") was 42% by mass. Nitrogen gas was allowed to bubble in this monomer composition (a1") being stirred, and heating of the monomer composition (a1") was then started. At a time point at which the temperature of the monomer composition (a1") reached 60° C., 0.1 part of 2,2'-azobis-(2,4-dimethylvaleronitrile) of a radical polymerization initiator was added thereto, the monomer composition (a1") was further heated until the temperature thereof reached 100° C., the state was then retained for 13 minutes. Thereafter, the reactor was cooled to room temperature, thereby obtaining syrup. The syrup thus obtained was a polymerizable monomer composition (A1') having 30% of a polymer (A1") and 70% of the monomer composition (a1') containing MMA at 58.0 parts, IBXMA at 39.0 parts, IBXA at 2.0 parts, TBMA at 0.4 part, and BA at 0.6 part. At this time, the content of the (meth)acrylic acid ester (M) in the polymerizable monomer composition (A1') was 42% by mass.

(2) Cast Polymerization

To 100 parts of the polymerizable monomer composition (A1') described above, 0.12 part by mass of EDMA as the monomer (B), and 13.6 parts of the CR-570 as the phosphoric acid ester (c) were added, and 0.30 part of t-hexyl peroxypivalate and 0.050 part of sodium dioctyl sulfosuccinate were further added thereto, thereby obtaining a polymerizable composition (X2). Two SUS plates were allowed to face each other and a vinyl chloride resin gasket was disposed at the end portion of a SUS plate between the two SUS plates, thereby fabricating a mold having an interval of the voids of 4.1 mm.

The polymerizable composition (X2) was poured into the mold described above and heated at 82° C. for 30 minutes and then at 130° C. for 30 minutes to be polymerized, and the polymerized product was then cooled. Thereafter, the SUS plate was removed to obtain a plate-shaped resin molded article having a thickness of 3 mm. From the resin molded article thus obtained, a specimen for flame retardancy evaluation, a specimen for heat resistance evaluation, and a specimen for transparency evaluation were cut out by using a cutting machine. The end face of the specimens thus cut was trimmed down by using a milling machine. The evaluation results of the resin molded article are presented in Table 6. The resin molded article thus obtained exhibited flame retardancy of V-0, heat resistance having a HDT of 91° C., and transparency having a total light transmittance of 91% and had a favorable ΔYI before and after the weather resistance test of 5.

Examples 61 to 63

Resin molded articles were obtained in the same manner as in Example 60 except that the monomer (B) was changed to those presented in Table 6. The evaluation results of the resin molded articles are presented in Table 6.

Examples 64 and 65

Syrup was obtained in the same manner as in Example 1 except that 40.0 parts of MMA, 57.0 parts of IBXMA, 2.0 parts of IBXA, 0.4 part of TBMA, and 0.6 part of BA were used as the monomer composition (a1"). At this time, the content of the (meth)acrylic acid ester (M) in the monomer composition (a1") was 60% by mass. The syrup thus obtained was a polymerizable monomer composition (A1') having 30% of a polymer (A1") and 70% of a monomer composition (a1') containing MMA at 40.0 parts, IBXMA at 57.0 parts, IBXA at 2.0 parts, TBMA at 0.4 part, and BA at 0.6 part. At this time, the content of the (meth)acrylic acid ester (M) in the polymerizable monomer composition (A1') was 60% by mass. Resin molded articles were obtained in the same manner as in Example 60 except that this polymerizable monomer composition (A1') was used and the phosphorus atom-containing compound (C) was added in the amount presented in Table 6. The evaluation results of the resin molded articles are presented in Table 6.

Examples 66 and 67

Syrup was obtained in the same manner as in Example 1 except that 20.0 parts of MMA, 77.0 parts of IBXMA, 2.0 parts of IBXA, 0.4 part of TBMA, and 0.6 part of BA were used as the monomer composition (a1"). At this time, the content of the (meth)acrylic acid ester (M) in the monomer composition (a1") was 80% by mass. The syrup thus obtained was a polymerizable monomer composition (A1') having 30% of a polymer (A1') and 70% of a monomer composition (a1') containing MMA at 20.0 parts, IBXMA at 77.0 parts, IBXA at 2.0 parts, TBMA at 0.4 part, and BA at 0.6 part. At this time, the content of the (meth)acrylic acid ester (M) in the polymerizable monomer composition (A1') was 80% by mass. Resin molded articles were obtained in the same manner as in Example 60 except that this polymerizable monomer composition (A1') was used and the phosphorus atom-containing compound (C) was added in the amount presented in Table 6. The evaluation results of the resin molded articles are presented in Table 6.

Example 68

Syrup was obtained in the same manner as in Example 1 except that 20.0 parts of MMA, 77.0 parts of CHMA, 2.0 parts of IBXA, 0.4 part of TBMA, and 0.6 part of BA were used as the monomer composition (a1"). At this time, the content of the (meth)acrylic acid ester (M) in the monomer composition (a1") was 80% by mass. The syrup thus obtained was a polymerizable monomer composition (A1') having 30% of a polymer (A1') and 70% of a monomer composition (a1') containing MMA at 20.0 parts, CHMA at 77.0 parts, IBXA at 2.0 parts, TBMA at 0.4 part, and BA at 0.6 part. At this time, the content of the (meth)acrylic acid ester (M) in the polymerizable monomer composition (A1') was 80% by mass. A resin molded article was obtained in the same manner as in Example 60 except that this polymerizable monomer composition (A1') was used and the phosphorus atom-containing compound (C) was added in the amount presented in Table 6. The evaluation results of the resin molded article are presented in Table 6.

Example 69

Syrup was obtained in the same manner as in Example 1 except that 40.0 parts of MMA, 58.0 parts of IBXMA, 1.0 part of IBXA, 0.4 part of TBMA, and 0.6 part of BA were used as the monomer composition (a1"). At this time, the content of the (meth)acrylic acid ester (M) in the monomer composition (a1") was 60% by mass. The syrup thus obtained was a polymerizable monomer composition (A1') having 30% of a polymer (A1") and 70% of a monomer composition (a1') containing MMA at 40.0 parts, IBXMA at 58.0 parts, IBXA at 1.0 part, TBMA at 0.4 part, and BA at 0.6 part. At this time, the content of the (meth)acrylic acid ester (M) in the polymerizable monomer composition (A1') was 60% by mass. A resin molded article was obtained in the same manner as in Example 60 except that this polymerizable monomer composition (A1') was used and the phosphorus atom-containing compound (C) was added in the amount presented in Table 6. The evaluation results of the resin molded article are presented in Table 6.

Example 70

Syrup was obtained in the same manner as in Example 1 except that 40.0 parts of MMA, 54.0 parts of IBXMA, 5.0 parts of IBXA, 0.4 part of TBMA, and 0.6 part of BA were used as the monomer composition (a1"). At this time, the content of the (meth)acrylic acid ester (M) in the monomer composition (a1") was 60% by mass. The syrup thus obtained was a polymerizable monomer composition (A1') having 30% of a polymer (A1") and 70% of a monomer composition (a1') containing MMA at 40.0 parts, IBXMA at 54.0 parts, IBXA at 5.0 parts, TBMA at 0.4 part, and BA at 0.6 part. At this time, the content of the (meth)acrylic acid ester (M) in the polymerizable monomer composition (A1') was 60% by mass. A resin molded article was obtained in the same manner as in Example 60 except that this polymerizable monomer composition (A1') was used and the phosphorus atom-containing compound (C) was added in the amount presented in Table 6. The evaluation results of the resin molded article are presented in Table 6.

Example 71

Syrup was obtained in the same manner as in Example 1 except that 40.0 parts of MMA, 58.5 parts of IBXMA, 0.5 part of IBXA, 0.4 part of TBMA, and 0.6 part of BA were used as the monomer composition (a1"). At this time, the content of the (meth)acrylic acid ester (M) in the monomer composition (a1") was 60% by mass. The syrup thus obtained was a polymerizable monomer composition (A1') having 30% of a polymer (A1") and 70% of a monomer composition (a1') containing MMA at 40.0 parts, IBXMA at 58.5 parts, IBXA at 0.5 part, TBMA at 0.4 part, and BA at 0.6 part. At this time, the content of the (meth)acrylic acid ester (M) in the polymerizable monomer composition (A1') was 60% by mass. A resin molded article was obtained in the same manner as in Example 60 except that this polymerizable monomer composition (A1') was used and the phosphorus atom-containing compound (C) was added in the amount presented in Table 6. The evaluation results of the resin molded article are presented in Table 6.

Example 72

Syrup was obtained in the same manner as in Example 1 except that 40.0 parts of MMA, 49.0 parts of IBXMA, 10.0 parts of IBXA, 0.4 part of TBMA, and 0.6 part of BA were used as the monomer composition (a1"). At this time, the content of the (meth)acrylic acid ester (M) in the monomer composition (a1") was 60% by mass. The syrup thus obtained was a polymerizable monomer composition (A1') having 30% of a polymer (A1") and 70% of a monomer composition (a1') containing MMA at 40.0 parts, IBXMA at 49.0 parts, IBXA at 10.0 part, TBMA at 0.4 part, and BA at 0.6 part. At this time, the content of the (meth)acrylic acid ester (M) in the polymerizable monomer composition (A1') was 60% by mass. A resin molded article was obtained in the same manner as in Example 60 except that this polymerizable monomer composition (A1') was used and the phosphorus atom-containing compound (C) was added in the amount presented in Table 6. The evaluation results of the resin molded article are presented in Table 6.

Examples 73 and 74

Resin molded articles were obtained in the same manner as in Example 66 except that the plate thickness was changed to 1.0 mm and 30.0 mm. The evaluation results of the resin molded articles are presented in Table 6.

TABLE 6

| | | | | | | Unit | Example 60 | Example 61 | Example 62 | Example 63 | Example 64 | Example 65 | Example 66 | Example 67 |
|---|---|---|---|---|---|---|---|---|---|---|---|---|---|---|
| Polymerizable composition (X2) | Polymerizable monomer composition (A1') | Polymer (A1") | (Meth)acrylic acid ester (M) | MMA | | Parts | 17.4 | 17.4 | 17.4 | 17.4 | 12.0 | 12.0 | 6.0 | 6.0 |
| | | | | Methacrylic acid ester (M1) | IBXMA | Parts | 11.7 | 11.7 | 11.7 | 11.7 | 17.1 | 17.1 | 23.1 | 23.1 |
| | | | | | CHMA | Parts | — | — | — | — | — | — | — | — |
| | | | | Acrylic acid ester (M2) | IBXA | Parts | 0.6 | 0.6 | 0.6 | 0.6 | 0.6 | 0.6 | 0.6 | 0.6 |
| | | | | | CHA | Parts | — | — | — | — | — | — | — | — |
| | | | Copolymerizable monomer | TBMA | | Parts | 0.1 | 0.1 | 0.1 | 0.1 | 0.1 | 0.1 | 0.1 | 0.1 |
| | | | | BA | | Parts | 0.2 | 0.2 | 0.2 | 0.2 | 0.2 | 0.2 | 0.2 | 0.2 |
| | | Monomer composition (a1') | (Meth)acrylic acid ester (M) | MMA | | Parts | 40.6 | 40.6 | 40.6 | 40.6 | 28.0 | 28.0 | 14.0 | 14.0 |
| | | | | Methacrylic acid ester (M1) | IBXA | Parts | 27.3 | 27.3 | 27.3 | 27.3 | 39.9 | 39.9 | 53.9 | 53.9 |
| | | | | | CHMA | Parts | — | — | — | — | — | — | — | — |
| | | | | Acrylic acid ester (M2) | IBXA | Parts | 1.4 | 1.4 | 1.4 | 1.4 | 1.4 | 1.4 | 1.4 | 1.4 |
| | | | | | CHA | Parts | — | — | — | — | — | — | — | — |

TABLE 6-continued

| | | | | | | | | | | | | |
|---|---|---|---|---|---|---|---|---|---|---|---|---|
| | | Copolymerizable monomer | TBMA | Parts | 0.3 | 0.3 | 0.3 | 0.3 | 0.3 | 0.3 | 0.3 | 0.3 |
| | | | BA | Parts | 0.4 | 0.4 | 0.4 | 0.4 | 0.4 | 0.4 | 0.4 | 0.4 |
| | | Monomer (B) | EDMA | Parts | 0.12 | 0.7 | 0.30 | 0.07 | 0.12 | 0.12 | 0.12 | 0.12 |
| | | | NPGDMA | Parts | — | — | — | 0.05 | — | — | — | — |
| | Phosphorus atom-containing compound (C) | | CR570 | Parts | 13.6 | 13.6 | 13.6 | 13.6 | 14.9 | 12.4 | 16.3 | 11.1 |
| composition resin (Meth)acrylic | polymer (P) (Meth)acrylic | (Meth)acrylic acid ester (M) | Methacrylic acid ester (M1) | MMA | % | 57.9 | 57.9 | 57.8 | 57.9 | 39.9 | 39.9 | 19.9 | 19.9 |
| | | | | IBXA | % | 39.0 | 39.0 | 38.9 | 39.9 | 57.0 | 57.0 | 77.0 | 77.0 |
| | | | | CHMA | % | — | — | — | — | — | — | — | — |
| | | | Acrylic acid ester (M2) | IBXA | % | 2.00% | 2.00% | 2.00% | 2.00% | 2.00% | 2.00% | 2.00% | 2.00% |
| | | | | CHA | % | — | — | — | — | — | — | — | — |
| | | Copolymerizable monomer | | TBMA | % | 0.38% | 0.43% | 0.40% | 0.38% | 0.38% | 0.38% | 0.38% | 0.38% |
| | | | | BA | % | 0.60% | 0.60% | 0.60% | 0.60% | 0.60% | 0.60% | 0.60% | 0.60% |
| | | Monomer (B) | | EDMA | % | 0.12% | 0.07% | 0.30% | 0.07% | 0.12% | 0.12% | 0.12% | 0.12% |
| | | | | NPGDMA | % | — | — | — | 0.05% | — | — | — | — |
| | Phosphorus atom-containing compound C (*amount with respect to 100 parts by mass of (meth)acrylic polymer (P)) | | CR570 | Parts | 13.6 | 13.6 | 13.6 | 13.6 | 14.9 | 12.4 | 16.3 | 11.1 |
| Evaluation results | | Thickness of plate | | | mm | 3.0 | 3.0 | 3.0 | 3.0 | 3.0 | 3.0 | 3.0 | 3.0 |
| | | Flame retardancy (JIS) | | | (—) | ⊙ | ⊙ | ⊙ | ⊙ | ⊙ | ⊙ | ⊙ | ⊙ |
| | | Flame retardancy (UL 94) | | | (—) | V-0 | V-0 | V-0 | V-0 | V-0 | V-0 | V-0 | V-0 |
| | | Transparency (total light transmittance) | | | % | 92 | 92 | 92 | 92 | 92 | 92 | 92 | 92 |
| | | Heat resistance (heat deflection temperature: HDT) | | | (° C.) | 91 | 91 | 91 | 91 | 90 | 93 | 90 | 99 |
| | | Weather resistance test (ΔYI) | | | (—) | 5 | 5 | 5 | 5 | 5 | 5 | 5 | 5 |

| | | | | | | | | Example 68 | Example 69 | Example 70 | Example 71 | Example 72 | Example 73 | Example 74 |
|---|---|---|---|---|---|---|---|---|---|---|---|---|---|---|
| Polymerizable composition (X2) | Polymerizable monomer composition (A1') | Polymer (A1") | (Meth)acrylic acid ester (M) | Methacrylic acid ester (M1) | | MMA | | 6.0 | 12.0 | 12.0 | 12.0 | 12.0 | 6.0 | 6.0 |
| | | | | | | IBXMA | | — | 17.4 | 16.2 | 17.6 | 14.7 | 23.1 | 23.1 |
| | | | | | | CHMA | | 23.1 | — | — | — | — | — | — |
| | | | | Acrylic acid ester (M2) | | IBXA | | — | 0.3 | 1.5 | 0.2 | 3.0 | 0.6 | 0.6 |
| | | | | | | CHA | | 0.6 | — | — | — | — | — | — |
| | | | Copolymerizable monomer | | | TBMA | | 0.1 | 0.1 | 0.1 | 0.1 | 0.1 | 0.1 | 0.1 |
| | | | | | | BA | | 0.2 | 0.2 | 0.2 | 0.2 | 0.2 | 0.2 | 0.2 |
| | | Monomer composition a1' | (Meth)acrylic acid ester (M) | Methacrylic acid ester (M1) | | MMA | | 14.0 | 28.0 | 28.0 | 28.0 | 28.0 | 14.0 | 14.0 |
| | | | | | | IBXA | | — | 40.6 | 37.8 | 41.0 | 34.3 | 53.9 | 53.9 |
| | | | | | | CHMA | | 53.9 | — | — | — | — | — | — |
| | | | | Acrylic acid ester (M2) | | IBXA | | — | 0.7 | 3.5 | 0.4 | 7.0 | 1.4 | 1.4 |
| | | | | | | CHA | | 1.4 | — | — | — | — | — | — |
| | | | Copolymerizable monomer | | | TBMA | | 0.3 | 0.3 | 0.3 | 0.3 | 0.3 | 0.3 | 0.3 |
| | | | | | | BA | | 0.4 | 0.4 | 0.4 | 0.4 | 0.4 | 0.4 | 0.4 |
| | | Monomer (B) | | | | EDMA | | 0.12 | 0.12 | 0.12 | 0.12 | 0.12 | 0.12 | 0.12 |
| | | | | | | NPGDMA | | — | — | — | — | — | — | — |
| | Phosphorus atom-containing compound (C) | | | | | CR570 | | 11.1 | 12.4 | 12.4 | 12.4 | 12.4 | 16.3 | 16.3 |
| composition resin (Meth)acrylic | polymer (P) (Meth)acrylic | (Meth)acrylic acid ester (M) | Methacrylic acid ester (M1) | | | MMA | | 19.9% | 39.9% | 39.9% | 39.9% | 39.9% | 19.9% | 19.9% |
| | | | | | | IBXA | | — | 58.0% | 54.0% | 58.5% | 49.0% | 77.0% | 77.0% |
| | | | | | | CHMA | | 77.0% | — | — | — | — | — | — |
| | | | Acrylic acid ester (M2) | | | IBXA | | — | 1.00% | 5.00% | 0.50% | 10.00% | 2.00% | 2.00% |
| | | | | | | CHA | | — | — | 2.00% | — | — | — | — |
| | | Copolymerizable monomer | | | | TBMA | | 0.38% | 0.38% | 0.38% | 0.38% | 0.38% | 0.38% | 0.38% |
| | | | | | | BA | | 0.60% | 0.60% | 0.60% | 0.60% | 0.60% | 0.60% | 0.60% |
| | | Monomer (B) | | | | EDMA | | 0.12% | 0.12% | 0.12% | 0.12% | 0.12% | 0.12% | 0.12% |
| | | | | | | NPGDMA | | — | — | — | — | — | — | — |

TABLE 6-continued

|  |  |  |  |  |  |  |  |  |
|---|---|---|---|---|---|---|---|---|
|  | Phosphorus atom-containing compound C) (*amount with respect to 100 parts by mass of (meth)acrylic polymer (P)) | CR570 | 11.1 | 12.4 | 12.4 | 12.4 | 12.4 | 16.3 | 16.3 |
| Evaluation results | Thickness of plate | | 3.0 | 3.0 | 3.0 | 3.0 | 3.0 | 1.0 | 30.0 |
|  | Flame retardancy (JIS) | | ⊙ | ⊙ | ⊙ | ⊙ | ⊙ | ⊙ | ⊙ |
|  | Flame retardancy (UL 94) | | V-0 | V-0 | V-0 | V-0 | V-0 | V-0 | V-0 |
|  | Transparency (total light transmittance) | | 92 | 92 | 92 | 92 | 92 | 92 | 92 |
|  | Heat resistance (heat deflection temperature: HDT) | | 96 | 94 | 92 | 95 | 90 | 90 | 90 |
|  | Weather resistance test (ΔYI) | | 5 | 5 | 3 | 7 | 3 | 5 | 5 |

Comparative Example 1

To a reactor (polymerization kettle) equipped with a cooling tube, a thermometer, and a stirrer, 100 parts by mass of MMA was supplied, nitrogen gas was allowed to bubble in this MMA being stirred, and heating of MMA was then started. At a time point at which the internal temperature reached 60° C., 0.15 part by mass of 2,2'-azobis-(2,4-dimethylvaleronitrile) of a radical polymerization initiator was added thereto, the mixture was further heated until the internal temperature reached 100° C., the state was then retained for 13 minutes. Subsequently, the reactor was cooled to room temperature, thereby obtaining a polymerizable monomer composition containing polymethyl methacrylate at 30% by mass and MMA at 70% by mass.

A resin molded article was obtained in the same manner as in Example 1 except that this polymerizable monomer composition was used. The resin molded article thus obtained exhibited favorable heat resistance but inferior flame retardancy since the resin molded article did not contain the (meth)acrylic acid ester (M). The evaluation results of the resin molded article are presented in Table 7.

Comparative Example 2

A resin molded article was obtained in the same manner as in Example 2 except that the polymerizable monomer composition used in Comparative Example 1 was used. The evaluation results of the resin molded article are presented in Table 7. The resin molded article thus obtained exhibited favorable heat resistance but inferior flame retardancy since the resin molded article did not contain the (meth)acrylic acid ester (M).

Comparative Example 3

A resin molded article was obtained in the same manner as in Example 1 except that the polymerizable monomer composition of Comparative Example 1 was used and the amount of the phosphorus atom-containing compound (C) added was changed to 13.6 parts by mass. The evaluation results of the resin molded article are presented in Table 7. The resin molded article thus obtained exhibited favorable flame retardancy but inferior heat resistance since the resin molded article did not contain the (meth)acrylic acid ester (M) but contained the phosphorus atom-containing compound (C) in a great amount of 13.6 parts by mass.

Comparative Example 4

A resin molded article was obtained in the same manner as in Example 1 except that the polymerizable monomer composition of Example 1 was used and the amount of the phosphorus atom-containing compound (C) added was changed to 4.3 parts by mass. The evaluation results of the resin molded article are presented in Table 7. The resin molded article thus obtained exhibited favorable heat resistance but inferior flame retardancy since the resin molded article contained the phosphorus atom-containing compound (C) in a small amount of 4.3 parts by mass.

Comparative Example 5

A resin molded article was obtained in the same manner as in Example 9 except that the polymerizable monomer composition of Example 9 was used and the amount of the phosphorus atom-containing compound (C) added was changed to 4.3 parts by mass. The evaluation results of the resin molded article are presented in Table 7. The resin molded article thus obtained exhibited favorable heat resistance but inferior flame retardancy since the resin molded article contained the phosphorus atom-containing compound (C) in a small amount of 4.3 parts by mass.

Comparative Example 6

A resin molded article was obtained in the same manner as in Example 13 except that the monomer (B) was not used in the composition of the polymerizable monomer composition of Example 13. The evaluation results of the resin molded article are presented in Table 7. The resin molded article thus obtained exhibited favorable heat resistance but inferior flame retardancy since the resin molded article did not contain the monomer (B).

Comparative Example 7

A resin molded article was obtained in the same manner as in Example 14 except that the monomer (B) was not used and the amount of the phosphorus atom-containing compound (C) was increased in the composition of the polymerizable monomer composition of Example 14. The evaluation results of the resin molded article are presented in Table 7. The resin molded article thus obtained exhibited favorable heat resistance but inferior flame retardancy since the resin molded article did not contain the monomer (B).

Comparative Example 8

A resin molded article was obtained in the same manner as in Example 14 except that the monomer (B) was 0.05 part by mass and the amount of the phosphorus atom-containing compound (C) was increased in the composition of the polymerizable monomer composition of Example 14. The evaluation results of the resin molded article are presented in Table 7. The resin molded article thus obtained exhibited favorable heat resistance but inferior flame retardancy since the resin molded article contained the monomer (B) in a small amount.

Comparative Example 9

A resin molded article was obtained in the same manner as in Example 14 except that the monomer (B) was 0.50 part by mass and the amount of the phosphorus atom-containing compound (C) was increased in the composition of the polymerizable monomer composition of Example 14. The evaluation results of the resin molded article are presented in Table 7. The resin molded article thus obtained exhibited favorable heat resistance but inferior flame retardancy since the resin molded article contained the monomer (B) in a great amount.

Comparative Example 10

To a reactor (polymerization kettle) equipped with a cooling tube, a thermometer, and a stirrer, 100 parts of MMA was charged, nitrogen gas was allowed to bubble in this MMA being stirred, and heating of MMA was then started. At a time point at which the temperature of MMA reached 60° C., 0.15 part of 2,2'-azobis-(2,4-dimethylvaleronitrile) of a radical polymerization initiator was added thereto, the mixture was further heated until the temperature of MMA reached 100° C., the state was then retained for 13 minutes. Thereafter, the reactor was cooled to room temperature, thereby obtaining syrup. The syrup thus obtained was a monomer composition having 30% of a polymer (A1') and 70% of MMA. A resin molded article was obtained in the same manner as in Example 33 except that this monomer composition was used instead of the polymerizable composition (X2). The evaluation results of the resin molded article are presented in Table 7. The resin molded article thus obtained exhibited favorable heat resistance and transparency but poor flame retardancy since the resin molded article did not contain the (meth)acrylic acid ester (M).

Comparative Example 11

A resin molded article was obtained in the same manner as in Example 33 except that the amount of the phosphoric acid ester (C) added was changed to 37 parts. The evaluation results of the resin molded article are presented in Table 7. The resin molded article thus obtained exhibited favorable flame retardancy and transparency but poor heat resistance since the resin molded article contained the phosphoric acid ester (C) in a great amount of 37 parts.

Comparative Example 12

A resin molded article was obtained in the same manner as in Example 40 except that the amount of the phosphoric acid ester (C) added was changed to 37 parts. The evaluation results of the resin molded article are presented in Table 7. The resin molded article thus obtained exhibited favorable flame retardancy and transparency but poor heat resistance since the resin molded article contained the phosphoric acid ester (C) in a great amount of 37 parts.

Comparative Example 13

A resin molded article was obtained in the same manner as in Example 1 except that the composition of the polymerizable composition (X2) was changed to that presented in Table 7. The evaluation results of the resin molded article are presented in Table 7.

Comparative Example 14

A resin molded article was obtained in the same manner as in Example 38 except that the monomer (B) was not added. The evaluation results of the resin molded article are presented in Table 7. The resin molded article thus obtained exhibited favorable heat resistance and transparency but poor flame retardancy since the resin molded article did not contain the monomer (B).

Comparative Example 15

A resin molded article was obtained in the same manner as in Example 38 except that the amount of the monomer (B) was changed to 0.05 part by mass. The evaluation results of the resin molded article are presented in Table 7. The resin molded article thus obtained exhibited favorable heat resistance and transparency but poor flame retardancy since the resin molded article contained the monomer (B) in a small amount.

Comparative Example 16

A resin molded article was obtained in the same manner as in Example 38 except that the amount of the monomer (B) was changed to 0.50 part by mass. The evaluation results of the resin molded article are presented in Table 7. The resin molded article thus obtained exhibited favorable the heat resistance and transparency but poor flame retardancy since the resin molded article contained the monomer (B) in a great amount.

TABLE 7

| | | | | | | Unit | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Polymerizable composition (X2) | Polymerizable monomer composition (A1') | Polymer (A1") | | MMA | | Parts | 30 | 30 | 30 | 20.4 | 7.5 | 20.4 |
| | | | (Meth)acrylic acid ester (M1) | Methacrylic acid ester (M1) | IBXMA | Parts | — | — | — | 6 | 21 | 9.45 |
| | | | | | CHMA | Parts | — | — | — | — | — | — |
| | | | (M1) | Acrylic acid ester (M2) | IBXA | Parts | — | — | — | 0.9 | 0.6 | 0.15 |
| | | | | | CHA | Parts | — | — | — | — | — | — |

TABLE 7-continued

| | | | | | | | | | | | |
|---|---|---|---|---|---|---|---|---|---|---|---|
| | | | | Copolymerizable monomer | TBMA | Parts | — | — | — | 2.4 | 0.6 | — |
| | | | | | BA | Parts | — | — | — | 0.3 | 0.3 | — |
| | | Monomer composition (a1') | (Methacrylic acid ester (M) | Methacrylic acid ester (M1) | MMA | Parts | 70 | 70 | 70 | 47.6 | 17.5 | 47.6 |
| | | | | | IBXA | Parts | — | — | — | 14 | 49 | 22.1 |
| | | | | | CHMA | Parts | — | — | — | — | — | — |
| | | | | Acrylic acid ester (M2) | IBXA | Parts | — | — | — | 2.1 | 1.4 | 0.35 |
| | | | | | CHA | Parts | — | — | — | — | — | — |
| | | | Copolymerizable monomer | | TBMA | Parts | — | — | — | 5.6 | 1.4 | — |
| | | | | | BA | Parts | — | — | — | 0.70 | 0.70 | — |
| | | Monomer (B) | | | EDMA | Parts | 0.15 | 0.15 | 0.15 | 0.15 | 0.15 | — |
| | | | | | NPGDMA | Parts | — | — | — | — | — | — |
| | Phosphorus atom-containing compound (C) | | | | CR570 | Parts | 7.5 | 10.5 | 13.6 | 4.3 | 4.3 | 10.5 |
| composition resin (Meth) acrylic | polymer (P) (Meth) acrylic | (Meth) acrylic acid ester (M) | Methacrylic acid ester (M1) | | MMA | % | 99.85% | 99.85% | 99.85% | 67.9% | 25.0% | 68.0% |
| | | | | | IBXMA | % | — | — | — | 20.0% | 69.9% | 31.5% |
| | | | | | CHMA | % | — | — | — | — | — | — |
| | | | Acrylic acid ester (M2) | | IBXA | % | — | — | — | 3.00% | 2.00 | 0.50% |
| | | | | | CHA | % | — | — | — | — | — | — |
| | | Copolymerizable monomer | | | TBMA | % | — | — | — | 7.95% | 1.95% | — |
| | | | | | BA | % | — | — | — | 1.00% | 1.00% | — |
| | | Monomer (B) | | | EDMA | % | 0.15% | 0.15% | 0.15% | 0.15% | 0.15% | — |
| | | | | | NPGDMA | % | — | — | — | — | — | — |
| | Phosphorus atom-containing compound (C) (*amount with respect to 100 parts by mass of (meth)acrylic polymer (P)) | | | | CR570 | Parts | 7.5 | 10.5 | 13.6 | 4.3 | 4.3 | 10.5 |
| Evaluation results | Thickness of plate | | | | | mm | 3.0 | 3.0 | 3.0 | 3.0 | 3.0 | 3.0 |
| | Flame retardancy (JIS) | | | | | (—) | XX | XX | XX | X | X | X |
| | Flame retardancy (UL 94) | | | | | (—) | Rejection | Rejection | Rejection | Rejection | Rejection | Rejection |
| | Transparency (total light transmittance) | | | | | % | 92 | 92 | 92 | 92 | 92 | 92 |
| | Heat resistance (heat deflection temperature: HDT) | | | | | (° C.) | 97 | 92 | 80 | 100 | 110 | 99 |
| | Weather resistance test (ΔYI) | | | | | (—) | 7 | 7 | 7 | 5 | 5 | 7 |

| | | | | | | | Comparative Example 7 | Comparative Example 8 | Comparative Example 9 | Comparative Example 10 | Comparative Example 11 |
|---|---|---|---|---|---|---|---|---|---|---|---|
| Polymerizable composition (X2) | Polymerizable monomer composition (A1') | Polymer (A1'') | | | MMA | | 21 | 20.4 | 20.4 | 30 | 20.4 |
| | | (Meth) acrylic acid ester (M1) | Methacrylic acid ester (M1) | | IBXMA | | 4.5 | 9.45 | 9.45 | — | 6 |
| | | | | | CHMA | | — | — | — | — | — |
| | | | Acrylic acid ester (M2) | | IBXA | | 4.5 | 0.15 | 0.15 | — | 0.9 |
| | | | | | CHA | | — | — | — | — | — |
| | | Copolymerizable monomer | | | TBMA | | — | — | — | — | 2.4 |
| | | | | | BA | | — | — | — | — | 0.3 |
| | Monomer composition (a1') | (Methacrylic acid ester (M) | Methacrylic acid ester (M1) | | MMA | | 49 | 47.6 | 47.6 | 70 | 47.6 |
| | | | | | IBXA | | 10.5 | 22.1 | 22.1 | — | 14 |
| | | | | | CHMA | | — | — | — | — | — |
| | | | Acrylic acid ester (M2) | | IBXA | | 10.5 | 0.35 | 0.35 | — | 2.1 |
| | | | | | CHA | | — | — | — | — | — |
| | | Copolymerizable monomer | | | TBMA | | — | — | — | — | 5.6 |
| | | | | | BA | | — | — | — | — | 0.70 |
| | | Monomer (B) | | | EDMA | | — | 0.02 | 0.5 | 0.12 | 0.12 |
| | | | | | NPGDMA | | — | — | — | — | — |
| | Phosphorus atom-containing compound (C) | | | | CR570 | | 10.5 | 10.5 | 10.5 | 16 | 37 |
| composition resin (Meth) acrylic | polymer (P) (Meth) acrylic | (Meth) acrylic acid ester (M) | Methacrylic acid | | MMA | | 70.0% | 68.0% | 67.7% | 99.88% | 68.0% |
| | | | ester (M1) | | IBXMA | | 15.0% | 31.5% | 31.4% | — | 20.0% |
| | | | | | CHMA | | — | — | — | — | — |
| | | | Acrylic acid ester (M2) | | IBXA | | 15.00% | 0.48% | 0.40% | — | 3.00% |
| | | | | | CHA | | — | — | — | — | — |
| | | Copolymerizable monomer | | | TBMA | | — | — | — | — | 7.88% |
| | | | | | BA | | — | — | — | — | 1.00% |
| | | Monomer (B) | | | EDMA | | — | 0.02% | 0.50% | 0.12% | 0.12% |
| | | | | | NPGDMA | | — | — | — | — | — |
| | Phosphorus atom-containing compound C) (*amount with respect to 100 parts by mass of (meth)acrylic polymer (P)) | | | | CR570 | | 10.5 | 10.5 | 10.5 | 16 | 37 |
| Evaluation results | Thickness of plate | | | | | mm | 3.0 | 3.0 | 3.0 | 3.0 | 3.0 |
| | Flame retardancy (JIS) | | | | | (—) | X | X | X | ⊙ | ⊙ |
| | Flame retardancy (UL 94) | | | | | (—) | Rejection | Rejection | Rejection | Rejection | V-0 |
| | Transparency (total light transmittance) | | | | | % | 92 | 92 | 92 | 92 | 92 |
| | Heat resistance (heat deflection | | | | | (° C.) | 90 | 99 | 99 | 70 | 54 |

TABLE 7-continued

| | | | | | | Comparative Example 12 | Comparative Example 13 | Comparative Example 14 | Comparative Example 15 | Example 16 |
|---|---|---|---|---|---|---|---|---|---|---|
| | | | | temperature: HDT) | | | | | | |
| | | | Weather resistance test (ΔYI) | | (—) | 3 | 7 | 7 | 5 | 5 |
| Polymerizable composition (X2) | Polymerizable monomer composition (A1') | Polymer (A1") | | MMA | | 12 | 6 | 20.4 | 20.4 | 20.4 |
| | | | (Meth)acrylic acid ester (M1) | Methacrylic acid ester (M1) | IBXMA | 17 | 23 | 6.0 | 6.0 | 6.0 |
| | | | | | CHMA | — | — | — | — | — |
| | | | | Acrylic acid ester (M2) | IBXA | 1 | 1 | 0.9 | 0.9 | 0.9 |
| | | | | | CHA | — | — | — | — | — |
| | | | Copolymerizable monomer | | TBMA | 0 | 0 | 2.4 | 2.4 | 2.4 |
| | | | | | BA | 0 | 0 | 0.3 | 0.3. | 0.3 |
| | | Monomer composition (a1') | (Meth)acrylic acid ester (M) | | MMA | 28 | 14 | 47.6 | 47.6 | 47.6 |
| | | | | Methacrylic acid ester (M1) | IBXA | 41 | 55 | 14 | 14 | 14 |
| | | | | | CHMA | — | — | — | — | — |
| | | | | Acrylic acid ester (M2) | IBXA | 1.0 | 1.0 | 2.1 | 2.1 | 2.1 |
| | | | | | CHA | — | — | — | — | — |
| | | | Copolymerizable monomer | | TBMA | — | — | 5.6 | 5.6 | 5.6 |
| | | | | | BA | — | — | 0.70 | 0.70 | 0.70 |
| | | Monomer (B) | | | EDMA | 0.12 | 0.12 | 0 | 0.02 | 0.05 |
| | | | | | NPGDMA | — | — | — | — | — |
| | Phosphorus atom-containing compound (C) | | | | CR570 | 37 | 37 | 16 | 16 | 16 |
| composition resin (Meth)acrylic | polymer (P) (Meth)acrylic | (Meth)acrylic acid ester (M) | Methacrylic acid ester (M1) | MMA | | 40.0% | 20.0% | 68.0% | 68.0% | 68.0% |
| | | | | | IBXMA | 58.0% | 78.0% | 20.0% | 20.0% | 20.0% |
| | | | | | CHMA | — | — | — | — | — |
| | | | Acrylic acid ester (M2) | | IBXA | 1.88% | 1.88% | 3.00% | 3.00% | 3.00% |
| | | | | | CHA | — | — | — | — | — |
| | | Copolymerizable monomer | | | TBMA | — | — | 8.00% | 7.98% | 7.95% |
| | | | | | BA | — | — | 1.00% | 1.00% | 1.00% |
| | | Monomer (B) | | | EDMA | 0.12% | 0.12% | 0.00% | 0.02% | 0.05% |
| | | | | | NPGDMA | — | — | — | — | — |
| | Phosphorus atom-containing compound (C) (*amount with respect to 100 parts by mass of (meth)acrylic polymer (P)) | | | | CR570 | 37 | 37 | 16 | 16 | 16 |
| Evaluation results | Thickness of plate | | | | mm | 3.0 | 3.0 | 3.0 | 3.0 | 3.0 |
| | Flame retardancy (JIS) | | | | (—) | ⊙ | ⊙ | X | X | X |
| | Flame retardancy (UL 94) | | | | (—) | V-0 | V-0 | Rejection | Rejection | Rejection |
| | Transparency (total light transmittance) | | | | % | 92 | 92 | 92 | 92 | 92 |
| | Heat resistance (heat deflection temperature: HDT) | | | | (° C.) | 57 | 58 | 74 | 74 | 74 |
| | Weather resistance test (ΔYI) | | | | (—) | 5 | 5 | 4 | 4 | 4 |

The invention claimed is:

1. A (meth)acrylic resin composition comprising a (meth)acrylic polymer (P) and a phosphorus atom-containing compound (C), wherein
the (meth)acrylic polymer (P) comprises
(1) a repeating unit derived from methyl methacrylate at 19.95% by mass or more and 84.95% by mass or less,
(2) repeating units derived from a (meth)acrylic acid ester (M), including
(2-1) a repeating unit derived from a methacrylic acid ester (M1) having an aromatic hydrocarbon group or an alicyclic hydrocarbon group having from 3 to 20 carbon atoms in a side chain at 10% by mass or more and 79.5% by mass or less and
(2-2) a repeating unit derived from an acrylic acid ester (M2) having an aromatic hydrocarbon group or an alicyclic hydrocarbon group having from 3 to 20 carbon atoms in a side chain at 0.50% by mass or more and 20% by mass or less, and
(3) a repeating unit derived from a monomer (B) having two or more vinyl groups at 0.05% by mass or more and 0.40% by mass or less;
a sum of the repeating unit derived from a methacrylic acid ester (M1) and the repeating unit derived from an acrylic acid ester (M2) is 15.0% by mass or more and 80.0% by mass or less; and
an amount of the phosphorus atom-containing compound (C) with respect to 100 parts by mass of the (meth)acrylic polymer (P) is 5.0 parts by mass or more and 35 parts by mass or less.

2. The (meth)acrylic resin composition according to claim 1, wherein an amount of the repeating unit derived from methyl methacrylate in the (meth)acrylic polymer (P) is 19.95% by mass or more and 79.1% by mass or less and an amount of the repeating units derived from a (meth)acrylic acid ester (M) is 20.5% by mass or more and 80.0% by mass or less.

3. The (meth)acrylic resin composition according to claim 1, wherein the (meth)acrylic polymer (P) is a polymer which comprises
(1) the repeating unit derived from a methacrylic acid ester (M1) at 10% by mass or more and 79.5% by mass or less and (2) the repeating unit derived from acrylic acid ester (M2) at 0.50% by mass or more and 20.0% by mass or less as the repeating units derived from a (meth)acrylic acid ester (M) and has a sum of the repeating unit derived from a methacrylic acid ester (M1) and the repeating unit derived from an acrylic acid ester (M2) of 20.5% by mass or more and 80.0% by mass or less.

4. The (meth)acrylic resin composition according to claim 1, wherein the methacrylic acid ester (M1) is at least one kind selected from the group consisting of isobornyl methacrylate and cyclohexyl methacrylate.

5. The (meth)acrylic resin composition according to claim 1, wherein the acrylic acid ester (M2) is at least one kind selected from the group consisting of isobornyl acrylate and cyclohexyl acrylate.

6. The (meth)acrylic resin composition according to claim 1, comprising a phosphorus atom-containing compound (C) at Y parts by mass with respect to 100 parts by mass of the (meth)acrylic polymer (P), wherein Y is represented by the following formulas:

$5.00 \leq Y \leq 13.6$ in a case of $15.0 \leq X \leq 41.4$, and $5.00 \leq Y \leq 0.0700X+10.7$ in a case of $41.4 < X \leq 80.0$, wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P).

7. The (meth)acrylic resin composition according to claim 1, comprising a phosphorus atom-containing compound (C) at Y parts by mass with respect to 100 parts by mass of the (meth)acrylic polymer (P), wherein Y is represented by the following formulas:

$7.6 < Y \leq 35.0$ in a case of $15.0 \leq X \leq 41.4$, and $-0.07X+16.5 < Y \leq 35.0$ in a case of $41.4 < X \leq 80.0$, wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P).

8. The (meth)acrylic resin composition according to claim 1, comprising a phosphorus atom-containing compound (C) at Y parts by mass with respect to 100 parts by mass of the (meth)acrylic polymer (P), wherein the (meth)acrylic polymer (P) is a polymer comprising
(1) the repeating unit derived from methyl methacrylate at 19.95% by mass or more and 58.6% by mass or less,
(2) the repeating unit derived from a (meth)acrylic acid ester (M) having an aromatic hydrocarbon group or an alicyclic hydrocarbon group having from 3 to 20 carbon atoms in a side chain at 41% by mass or more and 80% by mass or less, and
(3) the repeating unit derived from a monomer (B) having two or more vinyl groups at 0.05% by mass or more and 0.40% by mass or less, and Y is represented by the following formula:

$-0.07X+16.5 \leq Y \leq -0.07X+10.7$, wherein, X (unit: parts by mass) is a content of a repeating unit which is derived from a (meth)acrylic acid ester having an aromatic hydrocarbon group or an alicyclic hydrocarbon group having from 3 to 20 carbon atoms in a side chain and contained in the (meth)acrylic polymer (P) with respect to 100 parts by mass of the (meth)acrylic polymer (P).

9. The (meth)acrylic resin composition according to claim 1, wherein the monomer (B) is a compound having from 10 to 13 carbon atoms.

10. The (meth)acrylic resin composition according to claim 1, wherein the monomer (B) is at least one kind selected from the group consisting of ethylene glycol di(meth)acrylate and neopentyl glycol di(meth)acrylate.

11. The (meth)acrylic resin composition according to claim 1, wherein the phosphorus atom-containing compound (C) contains at least one kind selected from the group consisting of a phosphoric acid ester and a phosphonic acid ester.

* * * * *